United States Patent [19]

Rise

[11] 4,425,703

[45] Jan. 17, 1984

[54] BEARING ASSEMBLY MACHINE

[75] Inventor: William E. Rise, Utica, Mich.

[73] Assignee: Android Corporation, Auburn Heights, Mich.

[21] Appl. No.: 315,315

[22] Filed: Oct. 26, 1981

[51] Int. Cl.³ .............................................. B23P 19/04
[52] U.S. Cl. ............................... 29/724; 29/148.4 A; 29/148.4 R
[58] Field of Search .................. 29/724, 725, 148.4 A, 29/148.4 R, 149.5 R, 821, 434

[56] References Cited

U.S. PATENT DOCUMENTS

| | | | |
|---|---|---|---|
| 2,057,692 | 10/1936 | Rehnberg | 29/724 |
| 2,172,145 | 9/1939 | Rehnberg | 29/724 |
| 2,210,615 | 8/1940 | Brown | 29/724 |
| 3,014,267 | 12/1961 | Horvath | 29/148.4 A |
| 3,052,955 | 9/1962 | McAndrews et al. | 29/724 |
| 3,789,478 | 2/1974 | Stenger | 29/724 |

FOREIGN PATENT DOCUMENTS 597874 3/1978 U.S.S.R. ......................... 29/148.4 R
717425 2/1980 U.S.S.R. ................................. 29/724

Primary Examiner—Daniel C. Crane
Attorney, Agent, or Firm—Stephenson & Boller

[57] ABSTRACT

A bearing assembly machine for assembling a double row of needles separated by a spacer ring into a pinion. The assembly elements of the machine are urged by pneumatic cylinders in the direction of assembly. Each assembly element is cam controlled via a crank having one arm operatively connected between the corresponding pneumatic cylinder and the assembly element and the other arm biased against and riding on the perimeter of a cam disc. Each cam disc has a falling segment which allows the advance and a rising segment which overrides the bias of the pneumatic cylinder to cause the assembly element to retract. The pinion and spacer ring are conveyed by a shuttle from respective loading stations to the assembly station where assembly operations take place, and the shuttle is controlled in an analogous manner to the assembly elements.

26 Claims, 29 Drawing Figures

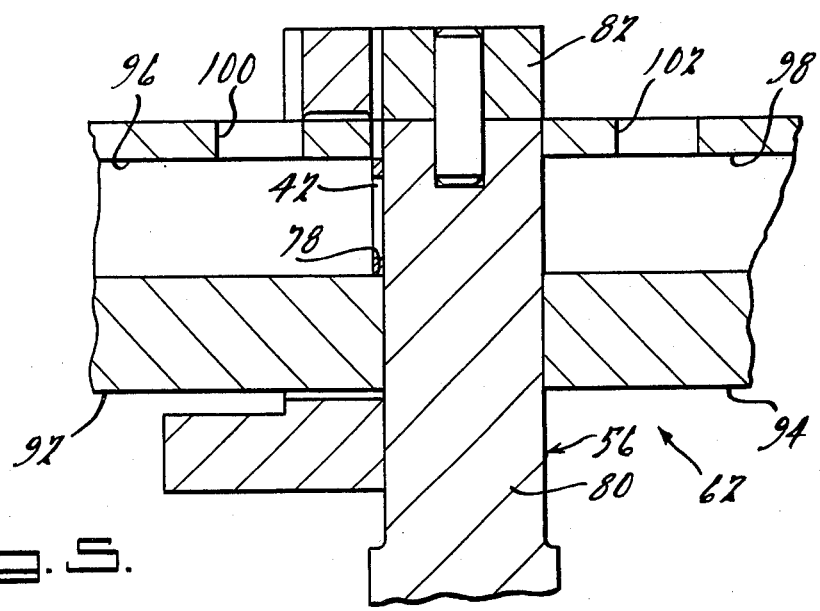
FIG. 5.
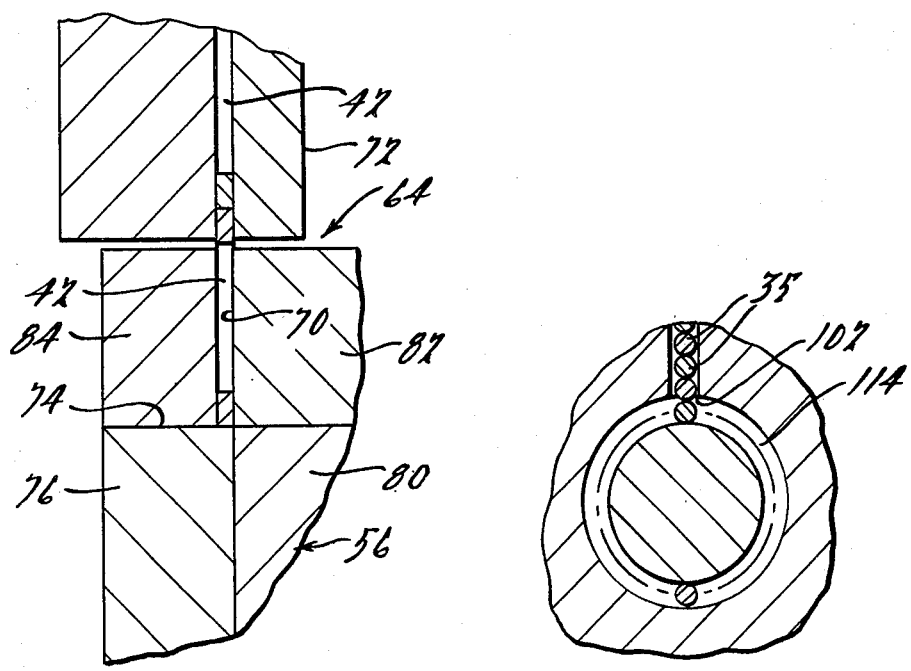
FIG. 7.
FIG. 9.

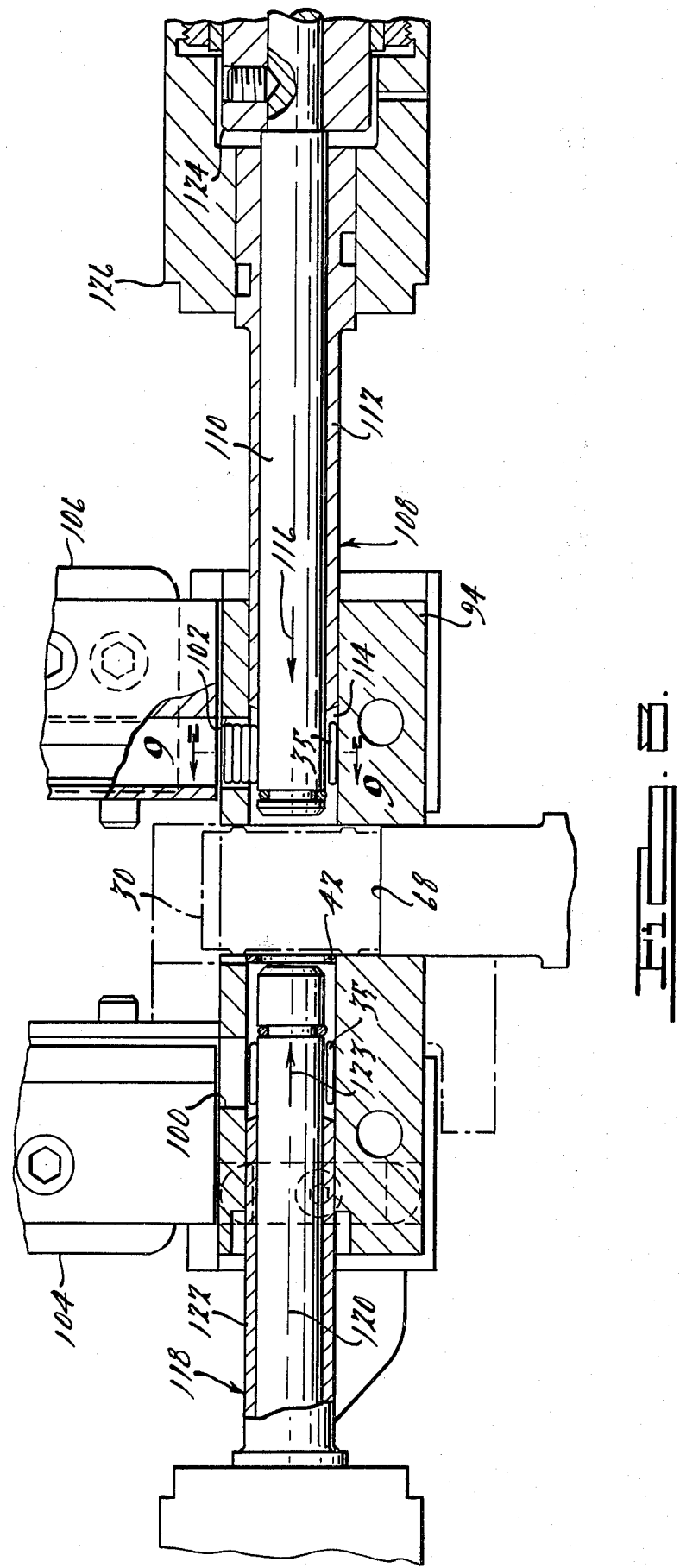

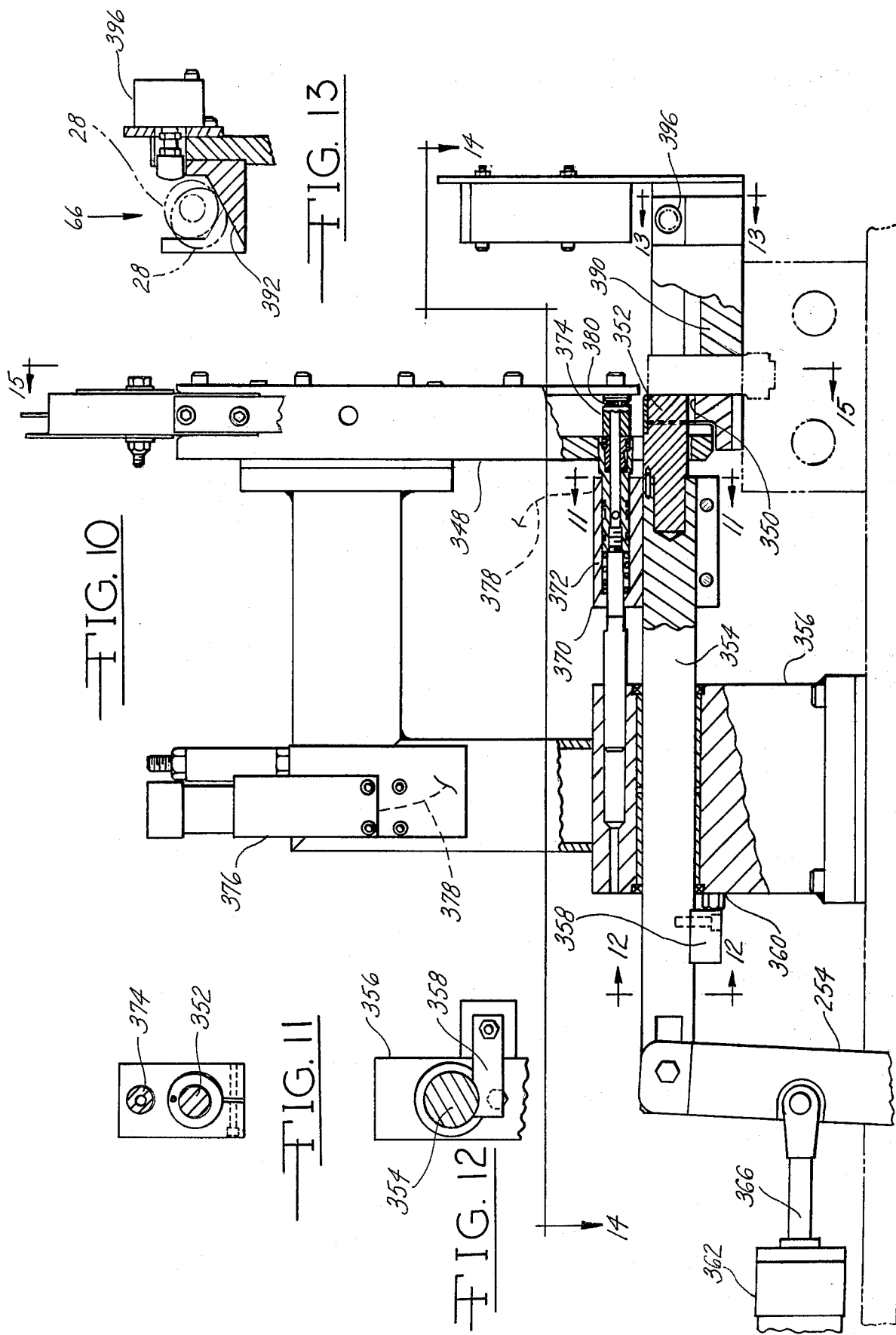

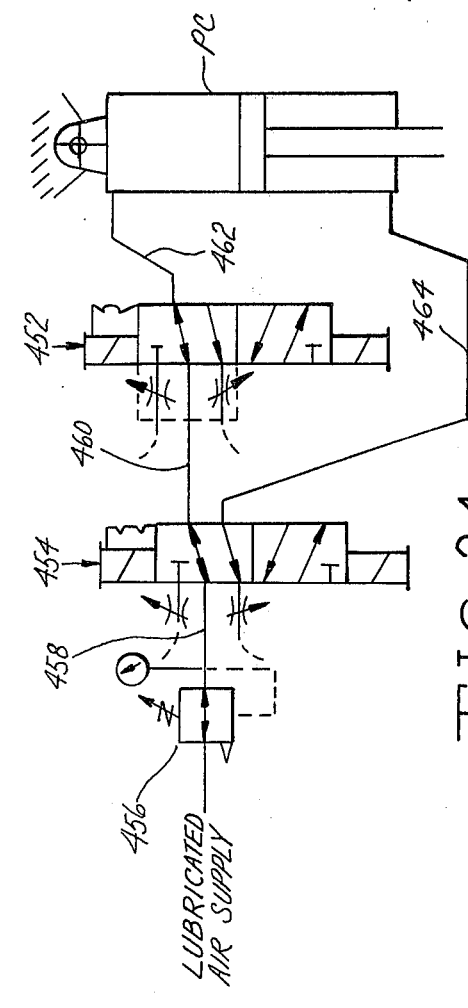
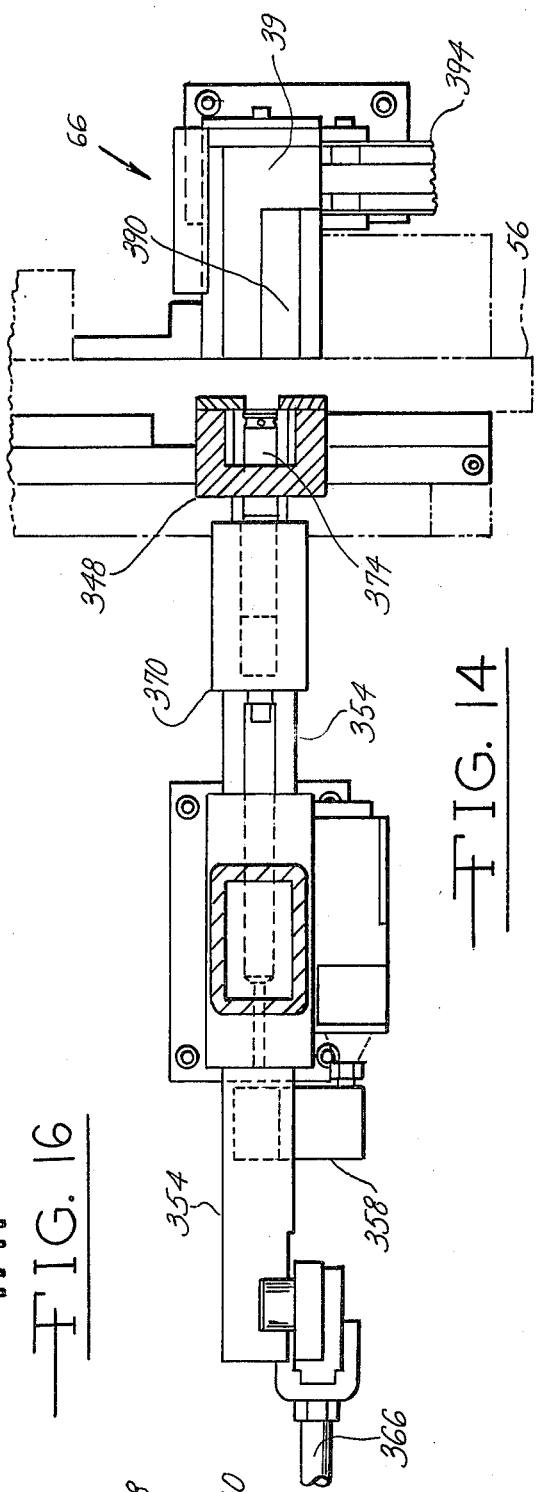
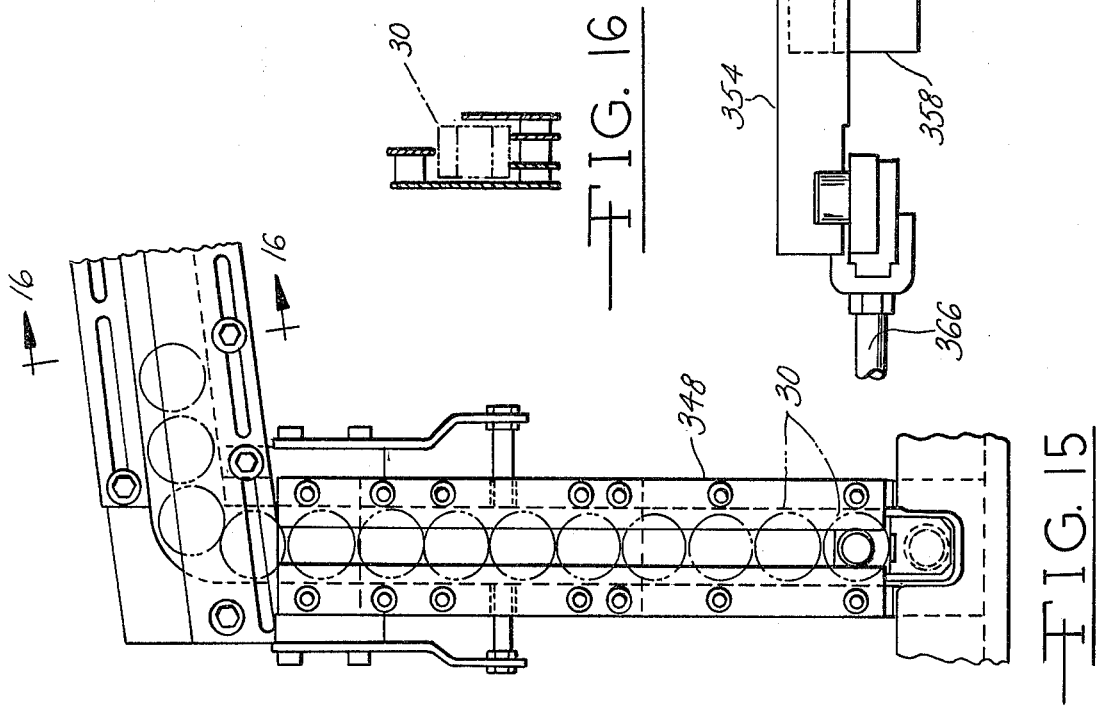
FIG. 24
FIG. 14
FIG. 16
FIG. 15

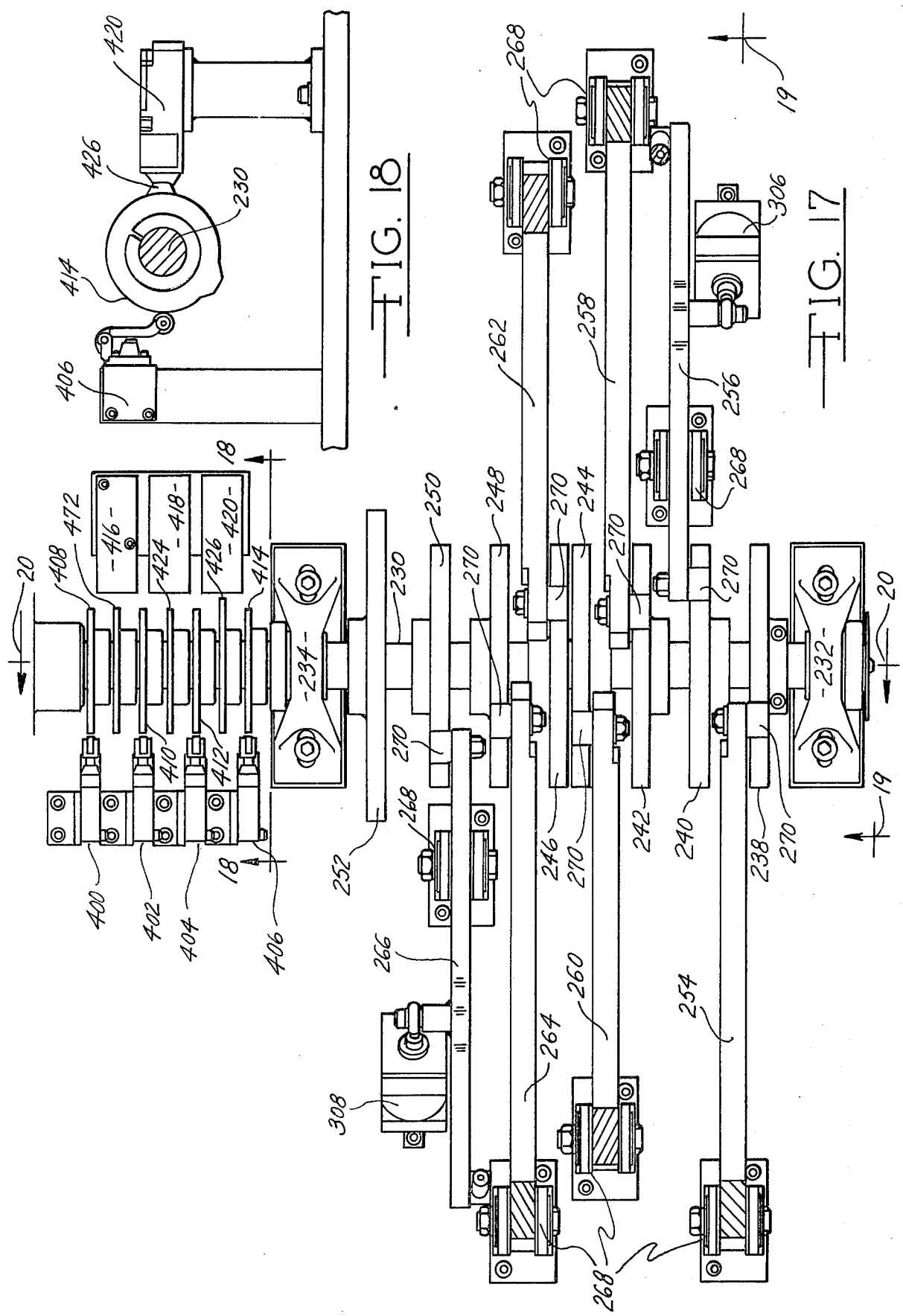

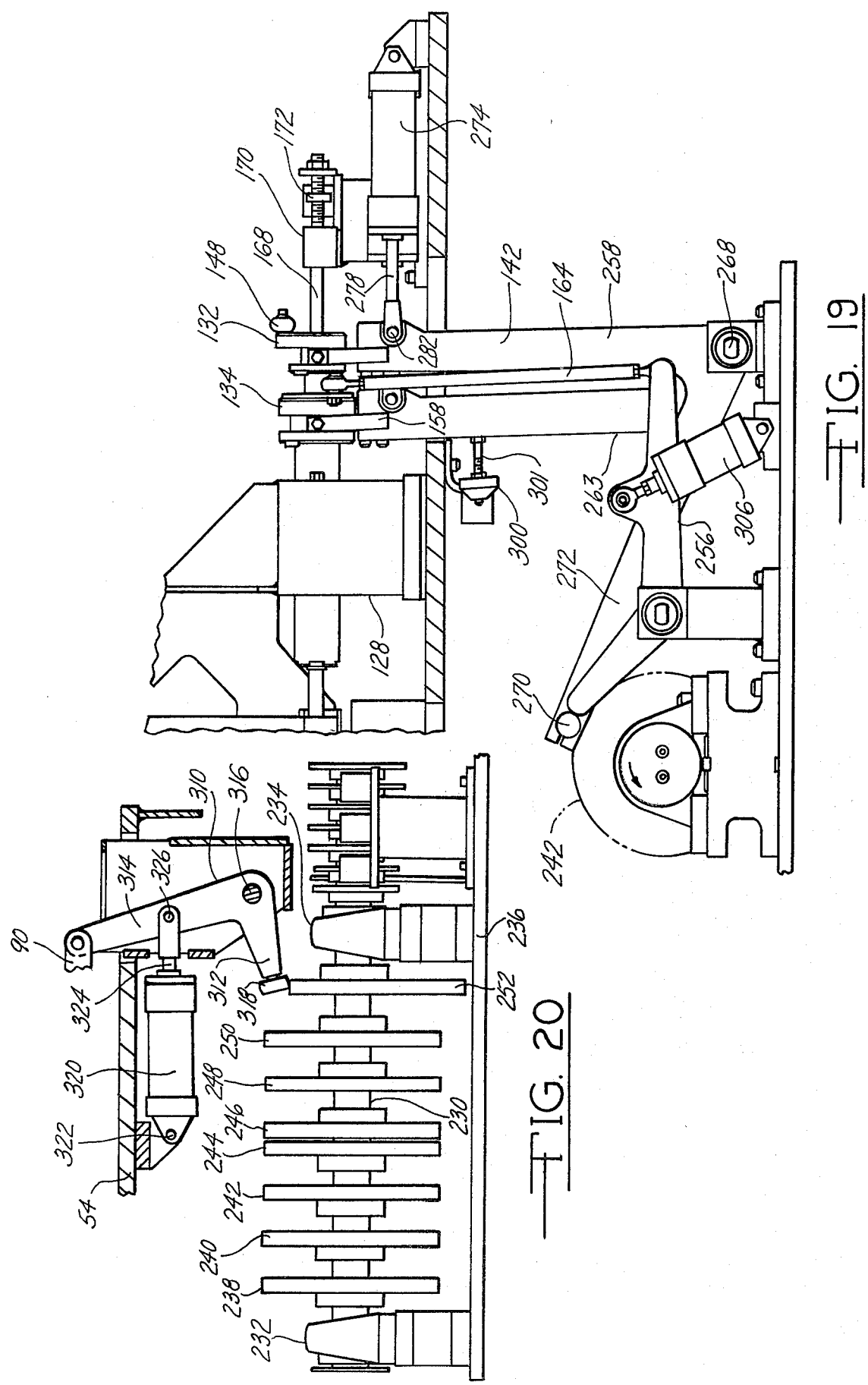

BEARING ASSEMBLY MACHINE

BACKGROUND AND SUMMARY OF THE INVENTION

This invention relates to bearing assembly machines with the preferred embodiment disclosed herein being of a needle bearing assembly machine for assembling a double row of needles into a pinion.

Bearing assembly machines are complicated pieces of equipment which automatically assemble a number of individual bearing elements to a retainer to form a bearing assembly. One type of bearing assembly which may be assembled by a bearing assembly machine comprises an annular retainer member into which a plurality of individual bearing needles are assembled in a circular array. The specific type of bearing assembly which is assembled by the bearing assembly machine disclosed in the present patent application is a pinion assembly comprising an annular pinion member into which two circular rows of bearing needles are assembled with the two rows being separated by an annular spacer element.

Because bearing assemblies are basically precision articles of manufacture, the requirements imposed on a bearing assembly machine are rather demanding. A bearing assembly machine must be capable of attaining precision assembly of the bearings, and in doing so it must handle a very large number of individual components rapidly and without damaging the components. A typical bearing assembly, regardless of its type, will normally comprise a large number of individual bearing elements. For example, in the bearing assembly which is disclosed in the present application, the two rows of bearing needles may each contain on the order of twenty individual needles. Accordingly, a single bearing assembly, including the spacer ring and the pinion, involves the assembly of forty-some individual components into a precision assembly. Moreover, in order to be cost-effective, a bearing assembly machine must be capable of a high production rate with its cycle time involving merely a few seconds. Given the assembly steps which are required for the typical bearing assembly, one can appreciate that a bearing assembly machine must comprise a number of rapidly moving machine elements which must be operated in extremely close synchronism.

Prior bearing assembly machines have used camshafts containing a number of individual cams for controlling individual machine elements. The cams contain tracks in which cam followers are captured. The followers are coupled via linkages with the machine elements which perform the assembly operations. Examples of these types of bearing assembly machines are shown in U.S. Pat. No. 2,057,692. One problem with this prior type of machine arises because the cam followers are captured within the cam tracks. Because the captured cam followers are constrained to follow their respective cam tracks, a jam during machine cycling can give rise to serious problems. A jam may be especially difficult to clear. Damage to the machine mechanism may have occurred and/or intentional mechanical disconnect devices, such as shear pins and the like, may have been activated. Obviously, where the machine components have been damaged they must be repaired and/or replaced, and where a disconnect device has been actuated it must be either replaced or reset. The resulting downtime impairs the overall efficiency of the machine. It may be necessary to reset the machine in order to establish the correct timing synchronization between the various assembly elements of the machine. These prior cam-actuated machines have a further disadvantage in that it is difficult to control the assembly forces. Because captured cam followers tend to impart definite forces to the machine elements which they control, mechanical springs are used to compensate those forces, where such compensation is necessary. The springs themselves are subject to tolerance and when cycled at the high rates which are demanded in a bearing assembly machine can present problems.

The present invention is directed to a new and improved bearing assembly machine which overcomes disadvantages of prior bearing assembly machines. With the present invention, and likelihood of jamming is reduced, and even if a jam occurs, the likelihood of damage to the machine is significantly reduced. Any jams which may occur can be cleared more rapidly and the amount of downtime is less. Assembly forces may be more accurately controlled and power efficiency is improved. A further, and very significant attribute of the invention is that productivity is dramatically increased over that obtainable with prior machines. For example, production rates of 1200 assemblies per hour or more are achievable with the present invention.

The foregoing features, advantages, and benefits of the invention, along with additional ones, will be seen in the ensuing description and claims which should be considered in conjunction with the accompanying drawings. The drawings disclose a preferred embodiment of the invention in accordance with the best mode contemplated at the present time for carrying out the invention.

BRIEF DESCRIPTION OF THE DRAWINGS

FIGS. 1A, 1B and 1C are diametrical cross sectional views through a pinion assembly illustrating steps in the assembly procedure which is executed by the bearing assembly machine of the present invention.

FIGS. 2a and 2b are fragmentary plan and frontal views respectively illustrating a modification to the machine of FIG. 1.

FIG. 6 is a view similar to FIG. 4 showing a different operative position.

FIG. 7 is an enlarged fragmentary vertical sectional view taken in the direction of arrows 7—7 in FIG. 6.

FIG. 8 is a fragmentary view of a portion of FIG. 1 on an enlarged scale.

FIG. 9 is an enlarged fragmentary vertical sectional view taken in the direction of arrows 9—9 in FIG. 8.

FIG. 10 is a fragmentary front vertical sectional view taken in the direction of arrows 10—10 in FIG. 2.

FIG. 11 is a vertical sectional view taken in direction of arrows 11—11 in FIG. 10.

FIG. 12 is a vertical sectional view taken in direction of arrows 12—12 in FIG. 10.

FIG. 13 is a vertical sectional view taken in direction of arrows 13—13 in FIG. 10.

FIG. 14 is a horizontal sectional view taken in direction of arrows 14—14 in FIG. 10.

FIG. 15 is a fragmentary vertical sectional view taken in the direction of arrows 15—15 in FIG. 10.

FIG. 16 is a sectional view taken in the direction of arrows 16—16 in FIG. 15.

FIG. 17 is a horizontal sectional view taken in the direction of arrows 17—17 in FIG. 1.

FIG. 18 is a vertical sectional view taken in the direction of arrows 18—18 in FIG. 17.

FIG. 19 is a front vertical sectional view taken in the direction of arrows 19—19 in FIG. 17.

FIG. 20 is a fragmentary vertical sectional view having portions broken away and on a reduced scale taken in the direction of arrows 20—20 in FIG. 17.

FIG. 21 is a fragmentary vertical sectional view taken in the direction of arrows 21—21 in FIG. 1.

FIG. 22 is a fragmentary vertical sectional view taken in the direction of arrows 22—22 in FIG. 1.

FIG. 24 is a schematic diagram of a pneumatic circuit used in conjunction with the machine.

DESCRIPTION OF THE PREFERRED EMBODIMENT

Figure 1:
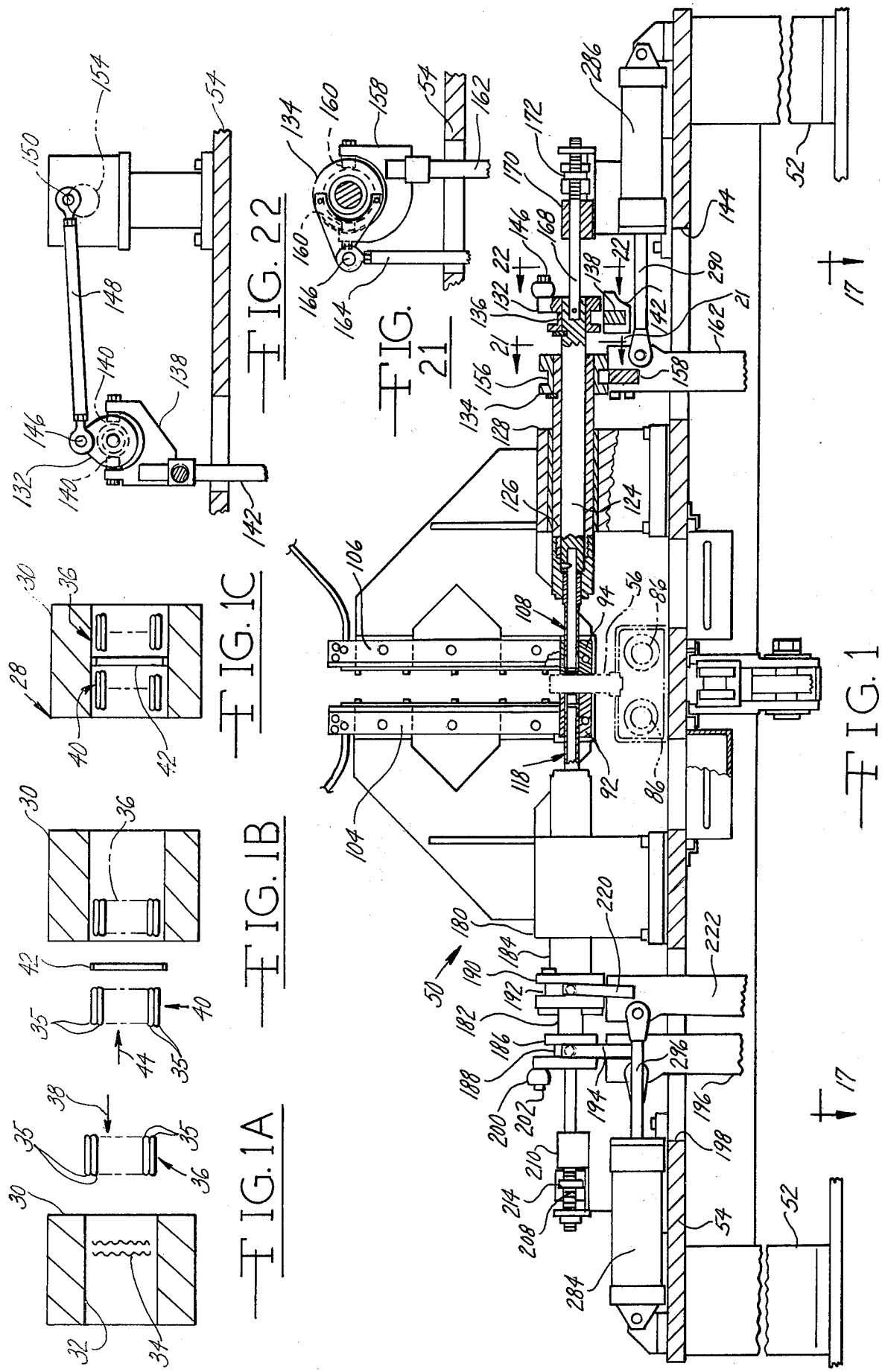
FIG. 1 is a front vertical sectional view, having portions broken away, of a bearing assembly machine embodying principles of the present invention.

Before considering the detailed explanation of the bearing assembly machine of the present invention, it is beneficial to explain the particular bearing assembly which is assembled by the disclosed preferred embodiment of bearing assembly machine. It will be appreciated, however, that principles of the invention are not limited to assembly of the particular type of bearing assembly which is disclosed herein. Therefore, the reader's attention is first directed to FIGS. 1A, 1B, and 1C which are cross sectional views of a pinion assembly 28 at different stages of assembly.

FIG. 1A illustrates one stage of assembly; FIG. 1B, a further stage of assembly; and FIG. 1C, the final assembly condition. The assembly 28 comprises an annular pinion member 30 having a circular bore 32. FIG. 1A illustrates the pinion member by itself before the individual bearing elements are assembled. Lubricant 34 is applied to bore 32 prior to assembly of the bearing elements. The lubricant is applied at a selected location of bore 32 and is wiped over the bore by the bearing elements during their assembly. The bearing elements of assembly 30 are bearing needles 35. The needles are arranged in two circular rows to fit closely within bore 35. The first row, or complement 36, of needles 35 is inserted into bore 32 from the right as indicated by the arrow 38. In the finished assembly, the row 36 occupies the right hand half of bore 32; however, when first inserted, it is displaced the full length of the bore to the position which will be finally occupied by the other complement of needles. During insertion of the first complement 36, the lubricant 34 is wiped across most of the bore, as well as being applied to the needles.

The assembly procedure is completed by next inserting the second complement 40 of needles and an annular spacer element 42 into bore 32 from the left as viewed in the drawing figures as indicated by the arrow 44. The complement 40 of needles is identical to the first complement 36 of needles. During insertion both complements 36, 40 are supported in circular arrays. As the second complement is inserted, the right hand ends of its individual needles bear against spacer element 42, which in turn bears against the left hand ends of the needles of the first complement. Complement 36 is thereby displaced to its final assembly position. In the completed assembly, the left hand complement 40 occupies the left half of bore 32 and complement 36 the right half, with spacer ring 42 separating the two and with both complements of needles lubricated. If it is desired to twist lock the needles in place, a skewing operation may be subsequently performed. This is sufficient to lock the needles with respect to the pinion until such a time as the pinion assembly is assembled onto a carrier element (not shown). In the completed installation of the pinion assembly then, the pinion 30 may be considered as corresponding to an outer retainer or race member and the carrier, an inner retainer or race member with the needles providing an extremely low friction bearing between these two relatively rotary members.

Having, therefore, described the example of bearing assembly which is disclosed in connection with the preferred embodiment of the present invention, it is now appropriate to consider the detailed construction of the preferred embodiment of the invention.

Figure 2:
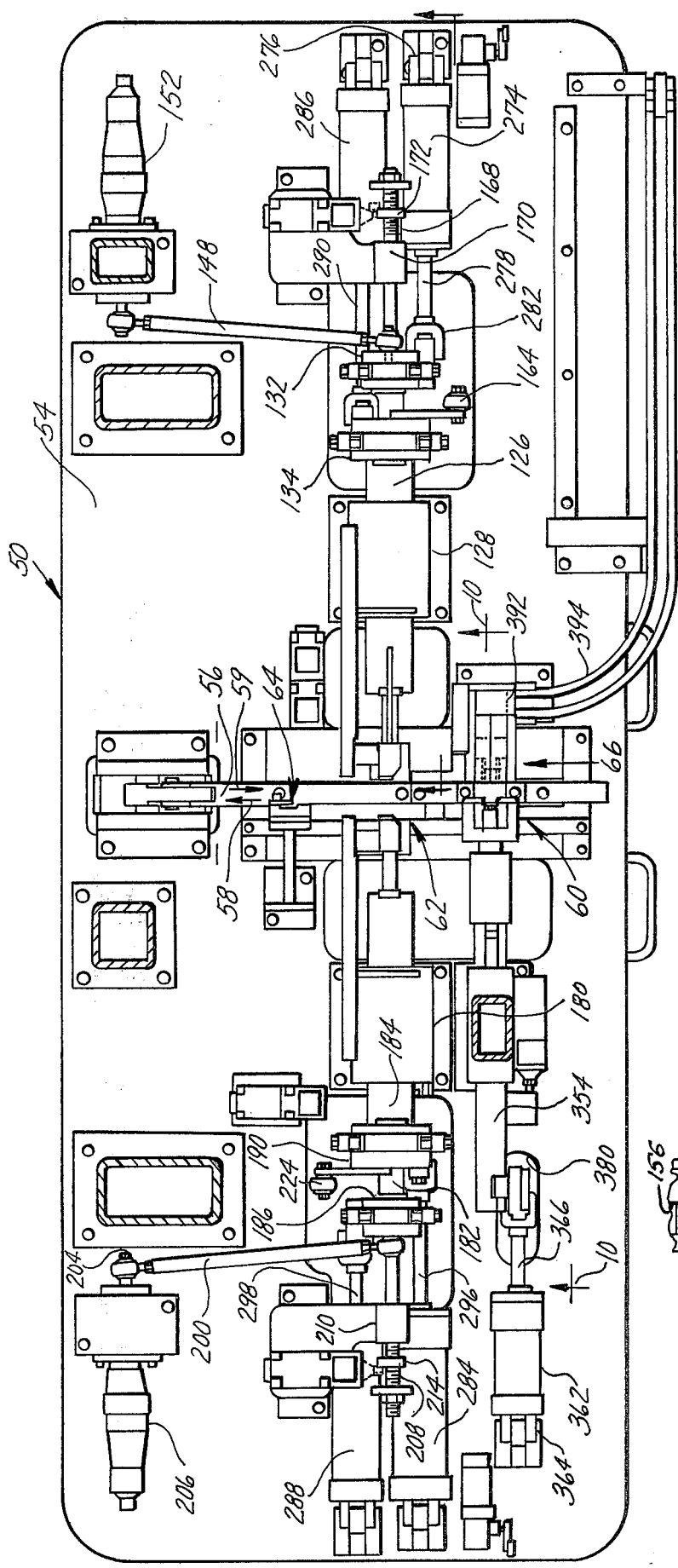
FIG. 2 is a top plan view of the bearing assembly machine of FIG. 1.

FIGS. 1 and 2 show the general organization of a major portion of the bearing assembly machine 50 of the present invention. The basic framework for the machine comprises a table having vertical legs 52 which support a horizontal table surface 54 at a vertical elevation above a base. The bearing assembly operations are conducted above the level of table surface 54; however, a portion of the machine mechanism is beneath the table surface at the level of the base.

The machine comprises a shuttle 56 which reciprocates back and forth in opposite directions indicated by the arrows 58 and 59 in FIG. 2. Greater detail of shuttle 56 can be seen in FIGS. 3 through 7. FIGS. 2, 3, 4 and 5 show shuttle 56 in the retracted position. FIGS. 6 and 7 show the shuttle in the forward position. Briefly, shuttle 56 operates to convey pinion members 30 and spacer rings 42 to an assembly station where they and the complements of bearing needles are assembled together and then to convey the completed assembly to an unloading station.

The machine may be considered as having several stations on table 54 associated with shuttle 56. Three of these stations, identified by the reference numerals 60, 62, and 64 are perhaps best seen in FIGS. 4 and 6.

Station 60 is a pinion loading station at which the pinion elements 30 are loaded into shuttle 56. The station is disposed on the table to the left side of the shuttle as viewed in FIG. 2. Station 62 is the assembly station where the assembly operations take place. Station 64 is a loading station at which the spacer rings 42 are loaded into shuttle 56. To the right side of the shuttle, directly opposite station 60, is an unloading station 66 (see FIG. 2) at which the completed pinion assemblies are unloaded from the shuttle.

Shuttle 56 contains a receptacle 68 (FIGS. 4 and 6) which is shaped to receive a pinion 30. Receptacle 68 is so located on the shuttle that with the shuttle in the retracted position, receptacle 68 is in lateral alignment with the pinion loading station 60 and the pinion assembly unloading station 66.

Figure 4:
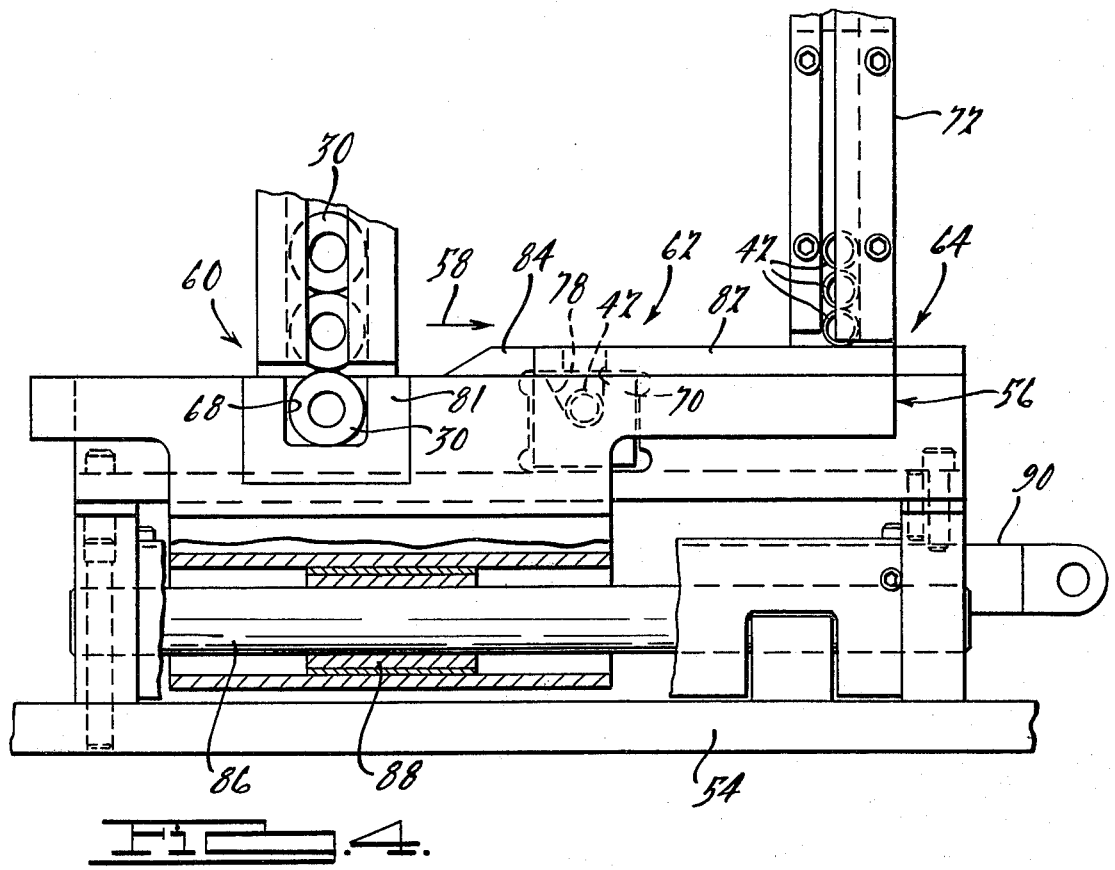
FIG. 4 is a fragmentary side elevational view, partly in section, taken in the direction of arrows 4—4 in FIG. 3 and enlarged.
Figure 5:
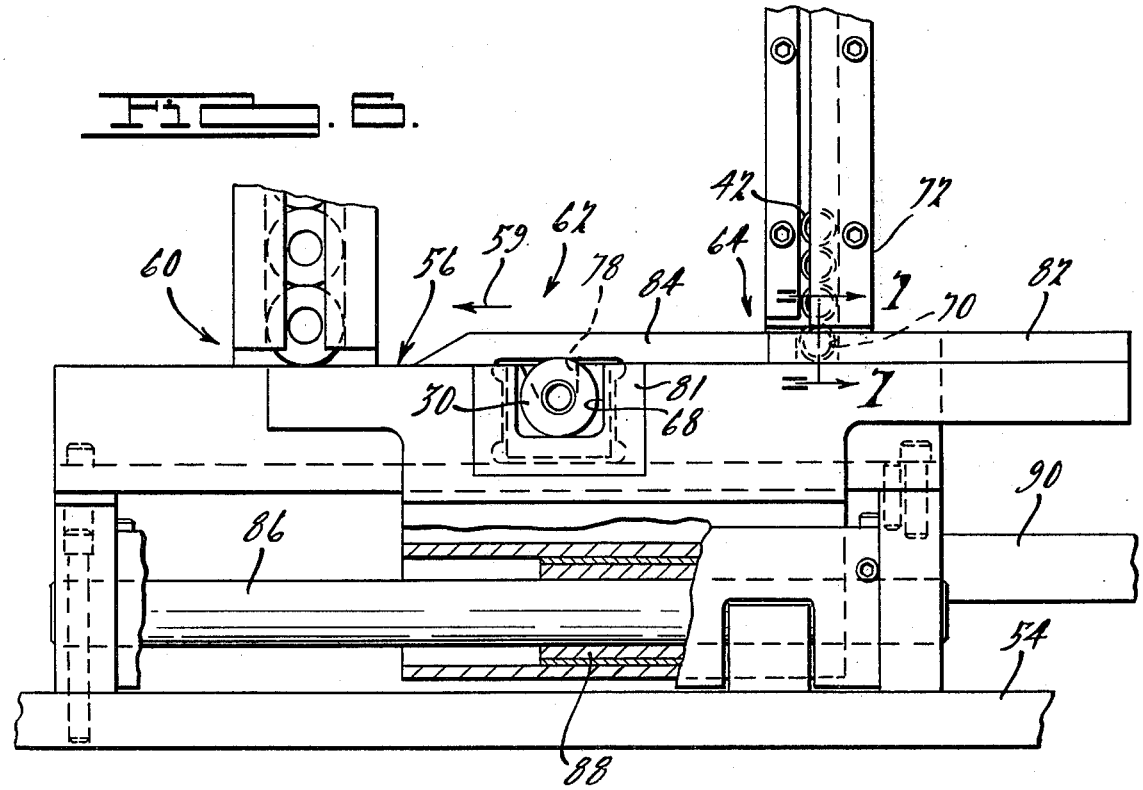
FIG. 5 is a vertical sectional view taken in the direction of arrows 5—5 in FIG. 3 and enlarged and having portions removed.

FIG. 4 illustrates a new pinion element 30 having been loaded into receptacle 68. Upon forward operation of the shuttle, (arrow 58) receptacle 68 is displaced to the right as viewed in FIG. 4 so that when the shuttle arrives at the forward position of FIG. 6, receptacle 68 is laterally aligned with assembly station 62.

Figure 3:
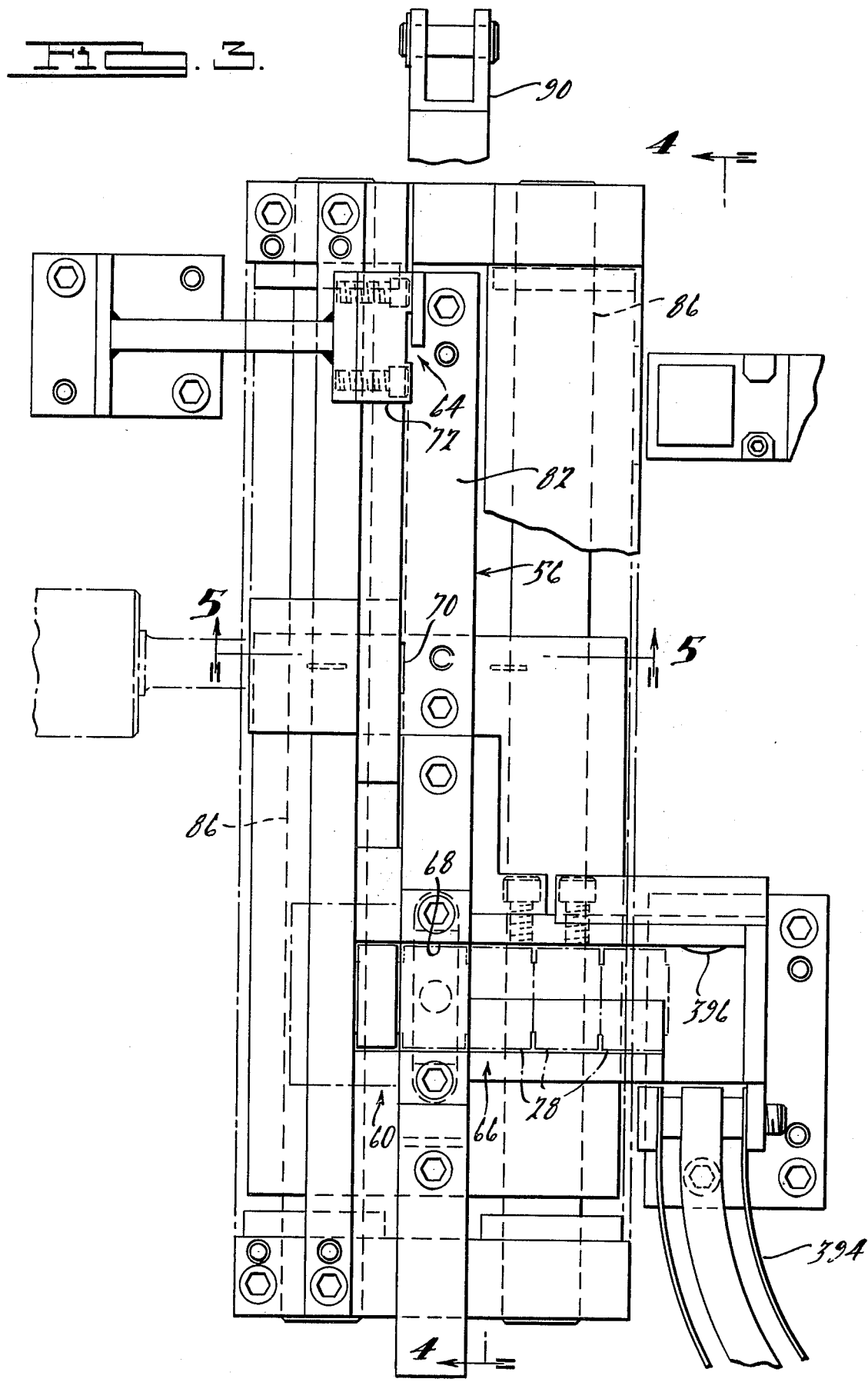
FIG. 3 is a fragmentary view of a portion of FIG. 2 on an enlarged scale.

The shuttle also includes a slot 70 for conveying a spacer ring from station 64 to station 62. As can be seen in FIG. 3, slot 70 is of a considerably narrower lateral dimension than that of receptacle 68, just wide enough for the much thinner spacer ring 42, and is disposed laterally of the path of travel of receptacle 68. When the shuttle is in the forward position, a new spacer ring 42 drops into slot 70 by gravity feed from a guide 72 containing vertically stacked spacer rings.

Slot 70 is dimensioned to receive only one spacer ring at a time so that when the shuttle operates toward the retracted position (arrow 59), a portion of the shuttle itself underlies the vertical stack of spacer rings preventing any further spacer ring from dropping down until such a time as the empty slot 70 once again returns to station 64 to receive the next spacer ring. During operation of the shuttle toward the retracted position the spacer ring is supported vertically on a stationary horizontal surface 74 adjacent the path of travel of the shuttle (see FIG. 7). Surface 74 is provided by a member 76 which is disposed alongside of the path of travel of the shuttle. Member 76 stops short of station 62 at a point which allows the shuttled spacer ring to drop vertically from slot 70 into a V-shaped ring holder receptacle 78 at station 62. The ring holder receptacle 78 is so located that the ring supported thereby will be axially aligned with the bore of a pinion element when the shuttle cycles forwardly to bring receptacle 68 and a new pinion element 30 to the work station 62. Suitable guides are provied on either side of the shuttle to laterally confine a pinion in receptacle 68 as its travels between stations 60 and 62.

In summary, operation of the shuttle is such that during the forward shuttle stroke (arrow 58), a new pinion element 30 is being brought to the assembly station 62 where a spacer ring has just been deposited in receptacle 78 by the shuttle at the conclusion of its last retraction stroke. Upon arrival of the shuttle at its forward position, the next spacer ring 42 drops into slot 70 and the assembly procedure explained above with reference to FIGS. 1A, 1B, and 1C is carried out at station 62 in a manner hereinafter described in more detail. Upon completion of the assembly operations at station 62, the shuttle is retracted to bring the completed pinion assembly to unload station 66 while at the same time conveying the new spacer ring in slot 70 to station 62 where it drops into receptacle 78. With the shuttle in the retracted position, station 60 loads a new pinion element 30 into receptacle 68 pushing the completed pinion assembly 28 out of receptacle 68 and onto the unloading station 66.

Shuttle 56 is an assembly of a number of individual component parts, one of which is a main shuttle body 80 containing receptacle 68. Receptacle 68 is actually provided in an insert 81 which is removably secured on body 80. This allows different sized pinions to be assembled simply by changing inserts 81. Another component of the shuttle is a top bar 82 which is affixed to the top of main body 80. The spacer ring slot 70 is formed in one side of bar 82, bar 82 having a lateral dimension slightly greater than the lateral dimension across the top surface of main body 80 on which bar 82 mounts. Fixedly mounted on member 76 is a further bar 84 disposed alongside bar 82 of the shuttle. The bar 84 is coextensive with the travel of the spacer ring slot 70 so as to laterally confine the spacer ring in slot 70.

The shuttle is guided for reciprocation on a pair of parallel guide rods 86 which are spaced laterally to either side of the main shuttle body 80 and vertically below the level of the receptacle 68. The shuttle includes bushings 88 which engage the guide rods 86. This arrangement minimizes friction between the shuttle and the associated components, promoting smooth rapid reciprocation of the shuttle on the machine. Motion is imparted to the shuttle via a link 90 at the forward end of the shuttle as can be seen in FIG. 4. The source of motion for the shuttle will be explained in greater detail hereinafter.

The operation of shuttle 56 in bringing pinion elements and spacer rings to assembly station 62 having been explained, it is now appropriate to consider further details relating to assembly station 62. Attention is first directed to FIG. 5 which is a vertical cross sectional view through assembly station 62 with the shuttle in the retracted position. Disposed on table 54 laterally on either side of the shuttle body at assembly station 62 are a pair of guide elements 92, 94. Elements 92 and 94 comprise respective circular cylindrical bores 96, 98 which are in axial alignment with each other, and which have their axes laterally perpendicular to the travel of shuttle 56. Receptable 78 is fashioned at the end of element 92 in juxtaposition to the shuttle main body 80. Each element 92, 94 further contains an aperture 100, 102 respectively, in the sidewall spaced from the shuttle. Both apertures 100, 102 are of the same size and both face upwardly. The purpose of each aperture 100, 102 is to conduct individual bearing needles into the bores 96, 98 with the needles passing through aperture 100 into bore 96 forming one complement of needles and the needles passing through aperture 102 forming the other complement of needles. To form the complement of needles in the required circular arrays, additional machine elements are associated with assembly station 62 and function in cooperation with the elements 92, 94, as will become apparent from the ensuing description.

As can be seen in FIGS. 1 and 8, bearing needles 35 are supplied to each aperture 100, 102 respectively by a corresponding needle feeder 104, 106 respectively. Each of the needle feeders is in vertical alignment with the corresponding aperture 100, 102 so as to allow the needles to pass through the apertures by force of gravity alone. In order to promote the feeding of the needles the feeders are perferably subjected to oscillating vibrations which improve the gravity feed of the needles so as to minimize any tendency for jamming. FIG. 9 illustrates needles 35 passing through opening 102 and into bore 98 to form a circular complement.

In order to form the circular array of bearing needles within bore 98, mandrel and sleeve assembly 108 is cooperatively arranged with respect to element 94. The mandrel and sleeve assembly is shown in detail in FIG. 8. It comprises two assembly elements, namely a mandrel 110 and a sleeve 112 disposed on the mandrel. FIG. 8 shows the mandrel and sleeve assembly in its retracted position where a complement of needles can form as a circular array within bore 98. The tip of mandrel 110 projects outwardy from sleeve 112 (i.e., to the left of the sleeve as viewed in FIG. 8). The tip of the mandrel extends beneath aperture 102, but the end of sleeve 112 stops short of aperture 102. This arrangement provides an annular space 114 around the tip of mandrel 112 in which a circular complement of bearing needles can be formed. In actual operation the bearing needles flow freely to fill this annular space and the dimensions of the space and the bearing needles are such that the exact same number of needles will fill the space for each assembly operation. Mandrel 110 and sleeve 112 can be independently shifted and rotated within bore 98 in a manner which will be explained later.

The complement of bearings formed in the annular space 114 is the complement 36. This complement is inserted into the awaiting pinion element in receptacle 68 by advancing both mandrel 110 and sleeve 112 in unison in the direction indicated by the arrow 116 in FIG. 8. As the tip of sleeve 112 passes across aperture 102, it separates the circular complement of needles from the overlying supply of needles in the feeder. The overlying supply of needles is supported on the outside of sleeve 112 so that needles do not enter bore 98 while the assembly 108 is advanced in the direction of arrow 116. As explained earlier, this complement 36 of needles is inserted into the pinion bore beyond the position which it will assume in the completed pinion assembly.

Disposed on the opposite side of the assembly station within bore 96 is another mandrel and sleeve assembly 118. This mandrel and sleeve assembly comprises a mandrel 120 and a sleeve 122. The assembly 118 forms a circular complement of bearing needles in bore 96 in the same manner as assembly 108 in bore 98. The two assemblies 108, 118 differ, however, in certain longitudinal dimensional details. Accordingly, it will be apparent that when the assembly 118 is in its retracted position, as shown in FIG. 8, a circular complement of bearing needles (complement 40) is formed in the annular free space around the portion of mandrel 120 which projects beyond the end of sleeve 122. The assembly elements 120, 122 are advanced in the direction of arrow 123 to assemble complement 40 into the pinion element, in the manner explained earlier in connection with FIGS. 1A, 1B, and 1C. The length of the tip of mandrel 120 is, however, somewhat longer that that of the tip of mandrel 110, thereby allowing the spacer ring 42 in receptacle 78 to be picked up by the mandrel 120. Stops (to be described in detail later) are associated with the mandrel 110 and the sleeve 112 so that the respective advances of the mandrel 110 and the sleeve 112 are stopped in pre-determined positions in relation to the pinion element 30 in receptacle 68 thereby to correspondingly position the complement of needles which has been inserted by assembly 108 into the pinion. Similar stops are associated with mandrel 120 and sleeve 122 and will be described later also.

Briefly, the operation of assembly 118 is generally such that mandrel 120 is advanced so that the tip of the mandrel abuts the advanced tip of the opposite mandrel 110. Abutment of the two mandrel tips occurs at a location which is generally flush with the left hand side of the pinion as viewed in FIG. 8. The left hand mandrel 120 at this time is at a point where it has just picked up the spacer ring in receptacle 78. Sleeve 122 is advanced to move the second complement of needles to the right as viewed in FIG. 8 so that the right hand end of this complement of bearings abuts the spacer ring. Sleeve 122 continues to advance so as to cause both complements of bearing needles to be displaced to the right as viewed in FIG. 8 with the spacer ring being sandwiched in-between. Sleeve 112 is also pushed toward its retracted position by the advance of sleeve 122. The forward advance of sleeve 122 is terminated when both complements of needles are in their correct positions with the spacer ring disposed at the center of the pinion separating the two rows of needles. As will become more apparent from later description, sleeve 112 is applying an opposing force causing the rows of needles and the intermediate spacer ring to be forcefully clamped together as both rows of needles are being simultaneously displaced to the right in FIG. 8. It is also preferred that mandrel 120 move in unison to the right with sleeve 122, pushing mandrel 10 also, until such time as the rows of needles are in their correct positions. At this time it may be desired to impart a twist lock, or skew lock, to the needles, thereby locking them in place so that they do not fall out of the pinion after the mandrels and sleeves are retracted. Details of the skew lock procedure will be explained later. The sleeves continue to apply a clamping force to the needles as the mandrel tips are retracted. Once the mandrels have been retracted, the sleeves are retracted thereby leaving the pinion assembly in its completed condition in receptacle 68. It will be observed that assembly operations have been conducted while the pinion remains in the receptacle of the shuttle constrained laterally by elements 92, 94.

While the foregoing description of the operation involved in assembling needles to a pinion reflects the general manner of operation, there are additional aspects and characteristics which will be better understood once the bearing assembly machine has been explained in more detail.

It is therefore now appropriate to consider greater detail of the mandrels and sleeves and the mechanisms for operating them. Attention can continue to be directed to FIGS. 1 and 8. Mandrel 110 is provided as a separably mounted tip on a mandrel support rod 124 while sleeve 112 is separably secured to a support sleeve 126. Rod 124 is a circular cylindrical element while sleeve 126 is a circular cylindrical element which fits closely on rod 124. Rod 124 and sleeve 126 are relatively moveable independently, both lengthwise and rotationally with respect to each other, to impart corresponding relative axial and rotary motions to mandrel 110 and sleeve 112 respectively. The relative fits are of a precise nature as required by the precision of the pinion assemblies. Sleeve 126 further has a close sliding and rotational fit with respect to a guide 128 mounted on table 54. A suitable journal sleeve may be provided between sleeve 126 and the circular cylindrical bore of guide 128 within which sleeve 126 is disposed.

Affixed to the end of rod 124, opposite mandrel 110, is a collar 132. A similar collar 134 is affixed to the end of support sleeve 126 opposite sleeve 112. Collar 132 comprises an annular groove 136 extending around the outside of the collar. A yoke 138 (see FIG. 22) is operatively associated with collar 132 and comprises a pair of rollers 140 diametrically opposite each other at the ends of the yoke. The rollers face inwardly and fit closely within groove 136. Yoke 138 mounts on the end of an arm 142 which projects upwardly through an opening 144 in table 54. Arm 142 is part of the drive mechanism for imparting axial motion to mandrel 110 and details of the drive arrangement will be explained later on.

The right hand end of collar 132 is further provided with a pin, or bolt, 146 which is eccentrically mounted with respect to the axis of the collar. As can be seen in FIG. 22, pin 146 is operatively coupled via a link 148 to a rotary crank 150. The rotary crank is powered by an air motor 152 (FIG. 2) with the result that the point at which link 148 connects to crank 150 executes a rotary motion indicated by the reference numeral 154 in FIG. 22. When motor 152 operates, link 148 imparts a limited angular rotational or rocking motion to collar 132, about 60° for example. The rollers 140 of yoke 138 riding in groove 136 permit the rocking motion to be imparted to the mandrel without interference. The purpose of rocking the mandrel is to promote the formation of the circular complement of needles. The connections of the ends of link 148 to the crank arm 150 and to the pin 146 include suitable bushings which allows the mandrel to be shifted axially by arm 142 without interference, as will be explained later in detail. Briefly, the axial shifting of the mandrel is derived from arm 142 swinging over an arc of rather large radius, centered below table 54. The transverse, or radial, component of motion of the arm has no effect on the axial translation of the mandrel because of the connection provided by rollers 140 and groove 136.

The arrangement for operating sleeve 112 is in many respects similar to that for operating mandrel 110. Collar 134 includes an annular groove 156 and a yoke 158 containing diametrically opposed inwardly directed rollers 160 is operatively associated with collar 134 with rollers 160 fitting (FIG. 21) closely within groove 156. The yoke is coupled with an arm 162 which extends downwardly through opening 144 below the level of the table 54 to the drive which will hereinafter be described. Arm 162 swings in an arc and is effective to impart axial motion to sleeve 112. The connection provided by the rollers 160 with groove 156 takes up the small radial component of motion of the arm 162. One end of a link 164 is connected eccentrically with collar 134 as indicated at 166. Link 164 projects downwardly through opening 144 to the drive for the machine hereinafter to be described. Briefly, link 164 is displaced generally vertically to impart a rotary arcuate, or rocking motion to sleeve 112 for skew locking.

Reference was made earlier to the fact that the advance of mandrel 110 into the pinion is limited by a stop. This stop is provided by a rod 168 extending coaxially from member 124 to the right as viewed in FIG. 1 through a circular hole in a stop block 170 which is fixedly mounted on table 154. The far end of rod 168 is threaded, and a stop nut 172 is threaded onto the threaded end of rod 168 and is adjusted on and locked to the rod in a position whereby when the mandrel tip is in the desired position of full advance (i.e., complement 36 being in the FIG. 1B position), nut 172 abuts stop block 170.

The mechanisms for operating mandrel 120 and sleeve 122 are analogous to those just described for mandrel 110 and sleeve 112. Mandrel 120 and sleeve 122 are removably mounted at tips on corresponding support members 182, 184 (FIG. 1) which are cooperatively arranged in the same manner as members 124, 126. Member 184 is supported and guided by a guide 180 analogous to guide 128. A collar 186 including a groove 188, is provided on mandrel support rod 182 while a collar 190, including a groove 192, is provided on the sleeve support 184. A yoke 194 is operatively associated with collar 186 and includes diametrically opposed rollers which engage groove 188. The yoke 194 is connected to an arm 196 which extends downwardly through an opening 198 in table 154 to the drive mechanism. A link 200 has one of its ends connected eccentrically with respect to collar 186 as indicated at 202 and the opposite end of link 200 is connected (FIG. 2) to a crank arm 204 which is driven by an air motor 206. This arrangement rocks mandrel 120 in an entirely analogous manner to the arrangement for rocking the opposite mandrel 110. As crank arm 204 rotates, an arcuate rocking motion is imparted to mandrel 120 which is entirely independent of any axial shifting of the mandrel which is caused by yoke 194 and arm 196. A similar stop arrangement for limiting the advancement of mandrel 120 is provided by means of a threaded rod 208 affixed to member 182 a stop block 210 on the table, and a nut 214 locked onto the rod in the desired location. This arrangement is analogous to that described in connection with mandrel 110, with nut 214 abutting block 210 when the mandrel 120 is in its full advanced position.

A yoke 220 containing diametrically opposed inwardly directed rollers is operatively associated with collar 190 with the rollers fitting closely within groove 192. Yoke 220 is connected to an arm 222 which extends through opening 198 below table 54 to the drive for the machine. Rotary arcuate motion is imparted to collar 190 via an eccentrically connected link 224 (FIG. 2) which also extends downwardly through opening 198 to the drive.

Hence, it will be appreciated from the preceding description that the general organization and arrangement of the machine at the assembly station is generally symmetrical about shuttle 68, although it will be appreciated that various differences are present in certain specific details and in the respective times at which the various assembly elements 110, 112, 120, 122 are operated.

Attention is next directed to details of the drive for the machine. Unlike the prior bearing assembly machines referred to earlier, the present invention has the assembly forces of its assembly elements imparted by pneumatic cylinders. In other words, a pneumatic cylinder is effective to advance a corresponding assembly element in the direction of assembly. Accordingly, should a jam occur (for example, needles jamming) there is reduced likelihood of damage to the machine because the maximum assembly force which can be exerted is determined by the pneumatic pressure in the cylinder which can be well regulated. Furthermore, air, unlike hydraulic fluid, is compressible and hence possesses a greater cushioning capability. Hence, if a jam occurs, the rod of the pneumatic cylinder involved simply does not extend to the end of its usual stroke and the compressed air power acts as a cushion and limits the actual forces which are applied to the machine mechanism in consequence of the jam.

The respective drives for the respective assembly elements are arranged so that the corresponding pneumatic cylinders exert continuous biases to urge the respective assembly elements in the direction of assembly. Control of the actual motion of the assembly elements is accomplished by means of a cam mechanism. The cam mechanism comprises a plurality of disc cams each operatively associated with a corresponding pneumatic cylinder. A corresponding crank is interposed between each cam and cylinder in such a way that the crank is biased by the cylinder against the cam, with the cam thereby establishing the position of the corresponding assembly element. Each cam rotates and is suitably profiled to produce the desired advance of the corresponding assembly element. Each crank has a cam follower roller engaging the corresponding cam, but unlike earlier bearing assembly machines, the cam follower rides on the perimeter of the cam disc, the follower being biased against the disc by the corresponding pneumatic cylinder. The cam profile falls to allow the corresponding assembly element to advance. The cam profile rises to override the bias force of the corresponding pneumatic cylinder causing the corresponding assembly element to retract. This drive arrangement is advantageous in that the likelihood of jamming is reduced, the potential for damage to the machine element is significantly lessened if a jam should occur, jams can be more readily cleared, and the operating speed of the machine can be substantially greater than previous machines.

The major part of the drives for the various machine elements is disposed near floor level below table 54. Details of the drives are best seen in FIGS. 17-20. Briefly, each crank is pivoted on a suitable bearing, and has a pair of arms which project at an angle to each other away from the pivot bearing. One of the arms of each crank is operatively connected with the corresponding assembly element of the machine while the other crank arm is operatively connected with the corresponding disc cam. Further associated with each drive is one of the pneumatic cylinders which serves to bias the crank toward engagement with the cam and causing the corresponding assembly element to be biased in the direction of assembly.

The individual cam discs are disposed on a common camshaft located directly below and parallel with the direction of shuttle travel. The camshaft is designated by the reference numeral 230 and is journalled on suitable bearings 232, 234. The bearings in turn are supported on a base plate 236 at floor level. Eight individual cam discs are mounted on camshaft 230 between bearings 232 and 234. These are designated by the reference numerals 238, 240, 242, 244, 246, 248, 250, and 252. The exact profiles of the cam peripheries are not shown in the drawing in the interest of clarity, and it will be understood that the cams are profiled in accordance with the timing diagram shown in FIG. 23 hereinafter explained. The camshaft is driven by a motor (not shown) to in turn rotate the cam discs in unison. The rotating cam discs in turn control the assembly operations via the cranks.

The cranks associated with cams 238, 244, 248 and 250 are disposed to the left side of the camshaft as viewed in FIG. 17, and the cranks associated with cams 240, 242, and 246 are disposed to the right side of the camshaft. The association of the cranks with the cams is as follows:

Cam 238 . . . Crank 254
Cam 240 . . . Crank 256
Cam 242 . . . Crank 258
Cam 244 . . . Crank 260
Cam 246 . . . Crank 262
Cam 248 . . . Crank 264
Cam 250 . . . Crank 266

Each of the above seven cranks is pivotally mounted on base plate 236 by means of a suitable pivot block 268.

Each crank comprises two crank arms, one of which is operatively associated with the corresponding cam disc by means of a roller 270 engaging the periphery of the cam disc. The other arm of each crank is operatively associated with the corresponding assembly element of the machine. Hence, in the case of crank 258, one of its two arms is the arm 142 referred to earlier which is operatively associated with the right hand mandrel 110. The other arm of crank 258, identified by the reference numeral 272, has its roller 270 engaged with the periphery of cam 242.

Further associated with crank 258 is a pneumatic cylinder 274 (see FIG. 2 also). Cylinder 274 is clevis-mounted on table 54 by means of a clevis 276 at the head end of the cylinder. The cylinder rod 278 projects from the rod end of the cylinder to the left as viewed in FIG. 2, and is connected by a pivot connection 282 to arm 142 of crank 258. In operation, pressurized air is introduced into the head end of cylinder 274 biasing cylinder rod 278 toward the extended position. This will tend to urge crank 258 in the counterclockwise direction about its pivot 268 as viewed in FIG. 19. Accordingly, mandrel 110 is urged toward the direction of assembly of the complement 36 of needles 35 into pinion 30 (i.e., to the left as viewed in FIGS. 1 and 2). In operation the advance of the mandrel is controlled by cam 242, but the assembly force is determined by cylinder 274. The arrangement is such that during normal operation, roller 270 of arm 272 is continuously biased against the perimeter of cam 242 by the force exerted by cylinder 274. One segment of the cam is profiled to fall allowing the crank to pivot in the counterclockwise direction. This allows the mandrel to advance in accordance with the cam profile. Similarly, another segment of the cam is profiled to rise. This latter segment is effective against the roller 270, and the opposing force of cylinder 274, to pivot the crank in the clockwise direction causing the mandrel to retract. Hence, the force for retracting the mandrel is derived from the camshaft drive motor and the rising cam profile determines the retraction motion. As will be explained later, there are times during the machine operating cycle when the advance of one assembly element interacts with another assembly element to cause a certain amount of retraction of the latter assembly element.

It will be observed with this type of drive arrangement that if a jam occurs during forward motion of the mandrel 110 impairing the mandrel advance, the falling cam profile simply causes the cam to fall away from the roller and the only force which is exerted on the jam is that due to pneumatic pressure of cylinder 274. If the cam continues to rotate to a point where the rising cam profile once again engages the roller, then the cam is thereafter effective to positively retract the mandrel. In other words, if a jam involving mandrel 110 is encountered during assembly of the needle bearings into the pinion, then the effect of the jam is taken up by disengagement of the roller 270 from the cam rather than being taken up by structural damage to the weakest parts of the mechanism, as might occur in the earlier type of machine described above. The pressure in cylinder 274 is set to provide a suitable force for assembling the bearing needles into the pinion in an efficient, expedient manner. During normal assembly, the force exerted on the bearing components is relatively small, just enough for the proper assembly. In a jam, the force increases, but, the magnitude of air pressure is such that damage to the component parts of the machine in the event of a jam is unlikely. In the case of the prior bearing assembly machine where the cam is captured in a cam track, the effect of a jam could cause much more serious consequences. Hydraulic power compounds the problem.

The arrangement and operation of cranks 256, 260, 262, 264 and 266, by their corresponding cam discs and pneumatic cylinders are analogues to that of crank 258, cylinder 274 and cam 242 just described. The arm 222 referred to earlier is one arm of crank 260 while the arm 196 referred to earlier is one arm of crank 264. The pneumatic cylinders associated with cranks 260, 262, 264 are identified by the reference numerals 284, 286 and 288 respectively. These cylinders, like cylinder 274 are clevis-mounted on table 54.

Cylinders 286 is mounted alongside cylinder 274 and has its rod 290 projecting to the left of the cylinder as viewed in FIG. 2 to connect with the arm 162 of crank 262. Cylinder 286, hence, urges sleeve 112 in the direction of assembly of complement 36 to pinion 30. The corresponding cam is profiled to fall to allow advance of the sleeve and to rise so as to cause the sleeve to retract. The stop which sets the full advanced position of sleeve 112 is identified by the numeral 300 (FIG. 19) and is provided on the underside of table 54 in a position to abut an adjustment 301 on the arm of crank 262 which connects to collar 134. There is also a corresponding stop (not shown) for sleeve 122.

In symmetrical fashion the cylinders 284, 288 are clevis-mounted on table 54 in a side-by-side fashion on the left-hand side. Their rods 296, 298 respectively, extend toward the right as can be seen in FIGS. 1 and 2. Rod 296 connects to arm 222 while rod 298 connects to arm 196. In this way, cylinders 284, 288 bias their respective cranks 260, 264 in the clockwise direction as viewed in FIG. 1 urging sleeve 122 and mandrel 120 respectively in the direction of assembly of complement 40 into pinion 30. The associated cams are profiled in analogous fashion to those previously described (i.e., one segment is a falling profile allowing the corresponding assembly element to advance and another segment is a rising profile causing retraction).

The pneumatic cylinders associated with cranks 256 and 266 are clevis-mounted on the lower plate 236. Cylinder 306 is associated with crank 256 and cylinder 308 with crank 266. These two cranks are in turn coupled with the links 164 and 224 respectively to impart arcuate motion to the sleeves 112, 122 for twist locking the needles as will be explained in detail later.

Cam 238 and the corresponding crank 254 are operatively associated with the operation which loads a new pinion into the shuttle and imparts lubricant to the bore of the overlying pinion element. The mechanism for that operation will be described in detail later on.

Cam 252 is operatively associated with shuttle 56. Detail of the coupling between the shuttle 56 and cam 252 is perhaps best seen in FIG. 20. A crank 310 having a pair of arms 312, 314 is pivotally mounted on the machine by means of a pivot 316. A roller 318 is affixed to the end of arm 312 and engages the periphery of cam 252. Arm 314 is coupled to link 90 of the shuttle via a pivotal connection. A pneumatic 320 is also operatively associated with crank 310. The cylinder is clevis-mounted on the underside of table 54 at 322. The rod 324 of cylinder 320 is pivotally connected at 326 to crank arm 314. This arrangement is such that the rod end of cylinder 320 is pressurized so as to bias crank 310 in the counterclockwise direction as viewed in FIG. 20. This in turn biases roller 318 against the perimeter of cam 252 and shuttle 56 toward the retracted position. The arrangement is analogous to the previous arrangements in that the position of the shuttle is thereby established by the profile of cam 252. As the cam profile rises, crank 310 pivots in the clockwise direction to move the shuttle forwardly against the opposing force of cylinder rod 324. When the cam profile falls, cylinder 320 exerts the force urging the crank arm in the counterclockwise direction so as to urge shuttle 56 toward the forward position. In this way, if a jam is countered during motion of the shuttle toward the retracted position, the falling cam profile simply disengages the cam from roller 318 thereby minimizing the risk of any damage to the component parts of the shuttle. As the cam profile rises, the cam itself forces the shuttle toward the forward position.

It will be observed in FIGS. 17, 18 and 20 that a series of cams mounts on camshaft 230 on the opposite side of bearing 234. These cams are operatively associated with a bank of limit switches and a bank of proximity switches for purposes which will be hereinafter explained in greater detail.

Attention is next directed to details of the pinion loading station 60 which may be best seen with reference to FIGS. 10, 11, 12, 14, 15, 16. Considering first FIGS. 10, 15 and 16, it will be seen that pinion elements are fed by gravity through a vertical chute 348 to the loading station. The loading station comprises a receptacle 350 which supports a new pinion in position immediately adjacent receptacle 68 which the shuttle is in the retracted position. When the new pinion is displaced to the right as viewed in FIG. 10 from receptacle 350, it is loaded into shuttle receptacle 68.

The mechanism for loading a new pinion into the shuttle receptacle 68 comprises a pusher tip 352 affixed to the right hand end of a pusher rod 354 (see FIG. 10). The drawing figure shows the pusher tip and rod in the advanced (i.e., right-most) position. A guide block 356 is mounted on table 54 to guide rod 354 for axial movement in a direction which is laterally perpendicular to the direction of shuttle travel. In the rod's advanced position, a bar 358, affixed to the rod abuts an adjustable stop 360 on guide block 356. When the pusher tip and rod are in the advanced position, the pusher tip has just pushed a new pinion from receptacle 350 into the shuttle receptacle 68.

The pusher rod and tip are shifted by means of crank 254. The end of one arm of crank 254 which projects upwardly through an opening 380 in table 54 has a suitable connection to the left-hand end of rod 354. The other arm of crank 254 is operatively associated with cam 238. A pneumatic cylinder 362 is clevis-mounted on table 54 at 364, and the rod 366 of cylinder 362 is connected to crank 354 at a pivotal connection 368. Pneumatic pressure is applied to the head end of cylinder 362 thereby biasing crank 254 in the clockwise direction as viewed in FIG. 10 and the pusher rod and tip toward the advanced position. The arm of crank 254 disposed below the level of the table engages cam 238. In operation, cam 238 controls the motion of the pusher rod and pusher tip. The cam has a falling segment which controls the advance of the pusher rod and tip in a manner analogous to that previously described in connection with the other cams and their associated elements. Another segment of cam 238 is a rising segment which is effective to rotate crank 254 in the counterclockwise direction against the bias force of cylinder 362 thereby causing the pusher rod and tip to operate to the retracted position. In the retracted position, the pusher tip is clear of receptacle 350 allowing a new pinion to drop from the vertical stack into receptacle 350. When the pusher tip is once again advanced, that new pinion is loaded into the shuttle receptacle.

The operation of applying lubricant to the bore of a pinion before the needles are assembled is also associated with the operation of pusher rod 354. For this purpose, a lubricant dispenser is carried by rod 354 adjacent pusher tip 352. The lubricant dispenser is designated generally by the reference numeral 370 and comprises a body 372 secured to rod 354. A lubricant dispenser tip 374 projects from body 372 parallel to and vertically above pusher tip 352. As can be seen in FIG. 10, when the pusher rod and tip are in the advanced position, the lubricant dispenser tip 374 is disposed within the vertical pinion chute. The arrangement is such that as the rod is shifted from the retracted to the advanced position, the lubricant dispenser tip 374 enters the bore of the pinion which is directly on top of the pinion resting in receptacle 350. Hence, as the pinion on receptacle 360 is pushed into the shuttle receptacle, the tip 374 engages the lowermost pinion of the stack thereby supporting that pinion and the overlying stack.

A lubricant dispensing valve 376 is mounted on the machine in proximity to the lubricant dispenser 370 and a flexible hose 378 connects from the valve 376 to the dispenser 370. The arrangement is such that when the tip 374 is within the lowermost pinion in the vertical stack of pinions, lubricant is dispensed from a series of radially directed apertures 380 in a groove in the tip thereby dispensing lubricant onto the bore of the pinion. When the rod 354 is retracted, the tip 374 is removed from the bore of the pinion allowing that pinion to drop onto receptacle 350. In this way, each pinion which comes onto receptacle 350 contains an appropriate amount of lubricant in its bore.

It was mentioned earlier that a completed pinion assembly is unloaded from shuttle receptacle 68 by being pushed from the shuttle receptacle by the new pinion which is loaded into the shuttle receptacle. The unloading station 66 includes a receptacle 390 in alignment with shuttle receptacle 68 when the latter is in the advanced position. Receptacle 390 allows several completed pinion assemblies to be collected side by side. When the oldest pinion assembly reaches the end of receptacle 390 it is in alignment with a ramp 392 leading to an exit chute 394. A solenoid actuated ejector 396 is disposed at the end of receptacle 390 (FIG. 13) to push the oldest pinion assembly onto the ramp where it rolls down the chute to exit the machine.

Reference was made earlier to the additional cams, limit switches, and proximity switches associated with camshaft 230. One of these switches, 400, is associated with air motor 152 while another switch 402 is associated with air motor 206. The third switch, 404, is operatively associated with the ejector 396 while the fourth switch 406 is operatively associated with lubricant valve 376. Controlling these switches are cams 408, 410, 412, and 414, respectively on the camshaft 230. The cams are profiled to operate the corresponding devices at appropriate times during a machine cycle. The three proximity switches 416, 418, 420 are operatively associated with the remaining cams 422, 424, 426, respectively. These proximity switches are operatively associated with an electrical control panel and are for the purpose of monitoring the relative position of the component parts to insure that loss of synchronization does not occur. The timing of these switches will become more apparent from later description, as will be explained hereinafter with reference to FIG. 23.

FIG. 24 schematically illustrates a pneumatic control circuit 450. Each of the pneumatic cylinders has such a circuit. In FIG. 24, the pneumatic cylinder is designated by the generic letter reference PC. The circuit comprises a first pneumatic directional control valve 452, a second pneumatic directional control valve 454, and a regulator valve 456.

The lubricated air supply is delivered to the inlet of regulator valve 456. The outlet port of regulator valve 456 is coupled by an air line 458 to the inlet port of valve 454. The outlet port of valve 454 is connected by an air line 460 to the inlet port of valve 452. The outlet port of valve 452 is coupled by an air line 462 to one end of the pneumatic cylinder. The other end of the pneumatic cylinder is coupled by an air line 464 to a return port of valve 454. For all cylinders, except shuttle cylinder 320, line 462 connects to the head end of the cylinder and line 464 to the rod end. For cylinder 320, these lines are reversed. The following description of circuit 450 is to the rod end.

In the illustrated condition of the circuit pressurized air passes through the three valves to pressurize the head end of the pneumatic cylinder. This urges the cylinder rod toward the extended position. As will be appreciated from the previous description of the bearing assembly machine, this biases the corresponding machine element in the forward direction. When the associated cam disc allows the cylinder rod to extend, pneumatic pressure extends the rod. The rod end of the cylinder is vented via the return line 464 through valve 454. When the cylinder rod is caused to retract by operation of the bearing assembly machine, the increasing pressure in the head end is quickly vented by regulator valve 456, thereby keeping the pressure in the head end of the pneumatic cylinder substantially constant. Valve 465 provides substantially constant air pressure over the entire operating stroke of the cylinder. The preferred valve is a Norgen Microtrol brand valve.

During normal operation of the bearing assembly machine, the directional control valves 452 and 454 remain in the positions illustrated in FIG. 24. In the event of a jam in which it becomes necessary to retract the cylinder rod, then both valves 452, 454 are activated to the other position allowing pressure to be supplied to the rod end of the cylinder and with the head end being vented.

Both head end and rod end of the cylinder may be vented by actuating only valve 452 from the position shown in FIG. 24. With both sides of the cylinder exhausted, the piston and hence, the cylinder rod are allowed to float.

In each pneumatic circuit the regulator valve 456 may be set to produce the desired assembly force on the corresponding assembly element. Because the preferred regulator valve 456 operates with virtually the same response in both directions of operations of the cylinder, excellent response of the individual assembly elements is attained. This contributes to the rapid assembly cycle and provides an efficient use of pneumatic power.

It will be recalled from an earlier description that each cam is effective to positively retract the corresponding assembly element by imposing a sufficient force on the associated crank which overcomes the opposing bias which is constantly imparted to the crank by the corresponding pneumatic cylinder. Certain of the individual assembly elements, however work cooperatively in opposition to each other. This is particularly the case for the pusher sleeves 112, 122.

In an assembly operation, pusher sleeve 112 and mandrel 110 are first advanced to insert the first complement of needles into the pinion. The assembly force on the needles is determined by the pneumatic pressure supplied to cylinder 286. The advance of the sleeve and mandrel is usually set by the corresponding stops. Hence, the falling segment of the corresponding cam will be designed to accommodate the possible adjustment range for the stops. However, as explained earlier, the preferred adjustment for the illustrated pinion assembly is such that the advance position for mandrel 110 and sleeve 112 will place the complement of bearings 36 in the left hand half of the pinion element.

As the assembly operation continues the opposite mandrel 120 and pusher sleeve 122 advance toward the already advanced mandrel 110 and sleeve 112. The profiles of the corresponding cams for mandrel 120 and sleeve 122 are such that the tip of mandrel 120 abuts the tip of mandrel 110 and the two complements of needles and spacer ring are sandwiched between the tips of the two pusher sleeves. In order to insert the two complements of needles and spacer ring into the pinion into their correct positions, mandrel 120 and sleeve 122 are further advanced. Their advance, however, is resisted by the pneumatic forces which are being applied by cylinders 274 and 286 to the opposite mandrel 110 and sleeve 112. Hence, it will be recognized that the pneumatic pressure and resultant assembly forces exerted by the mandrel 120 and sleeve 122 must exceed the opposing forces of the opposite mandrel 110 and sleeve 112. Accordingly, as mandrel 110 and sleeve 112 are retracted by their opposite counterparts, the cranks 258, 262 disengage their respective cams 242, 246. Consequently, the two complements of needles and spacer ring are held forcefully together as a unit as the unit is shifted bodily to the right to bring the two rows of needles to their final assembly position within the pinion bore. The final assembly position is established by stops associated with mandrel 120 and sleeve 122.

Once the needles are in the correct position within the pinion bore, the skewing operation can be performed. This involves imparting rotary motion to the pusher sleeves while the sleeves remain forcefully engaged with the needles. Link 164 is actuated by crank 256 to rotate sleeve 112 is one sense. Link 224 is actuated by crank 266 to rotate the opposite sleeve 122 in the opposite sense. The cranks are operated by suitable profiles of their associated cams. In this way, the two sets of needles are twisted in opposite directions to impart a skew locking to the needles sufficient to maintain the needles in the pinion until the pinion is put to use. When the pinion assembly is finally assembled into the carrier with which it is used, the act of pushing the inner race or shaft through the bearing assembly pushes the needles so as to break the skew lock, allowing the needles to assume their final positions parallel to the bore and free to rotate. After the skew locking operation has been completed, the mandrels and pusher sleeves are retracted by their cams.

Figure 23:
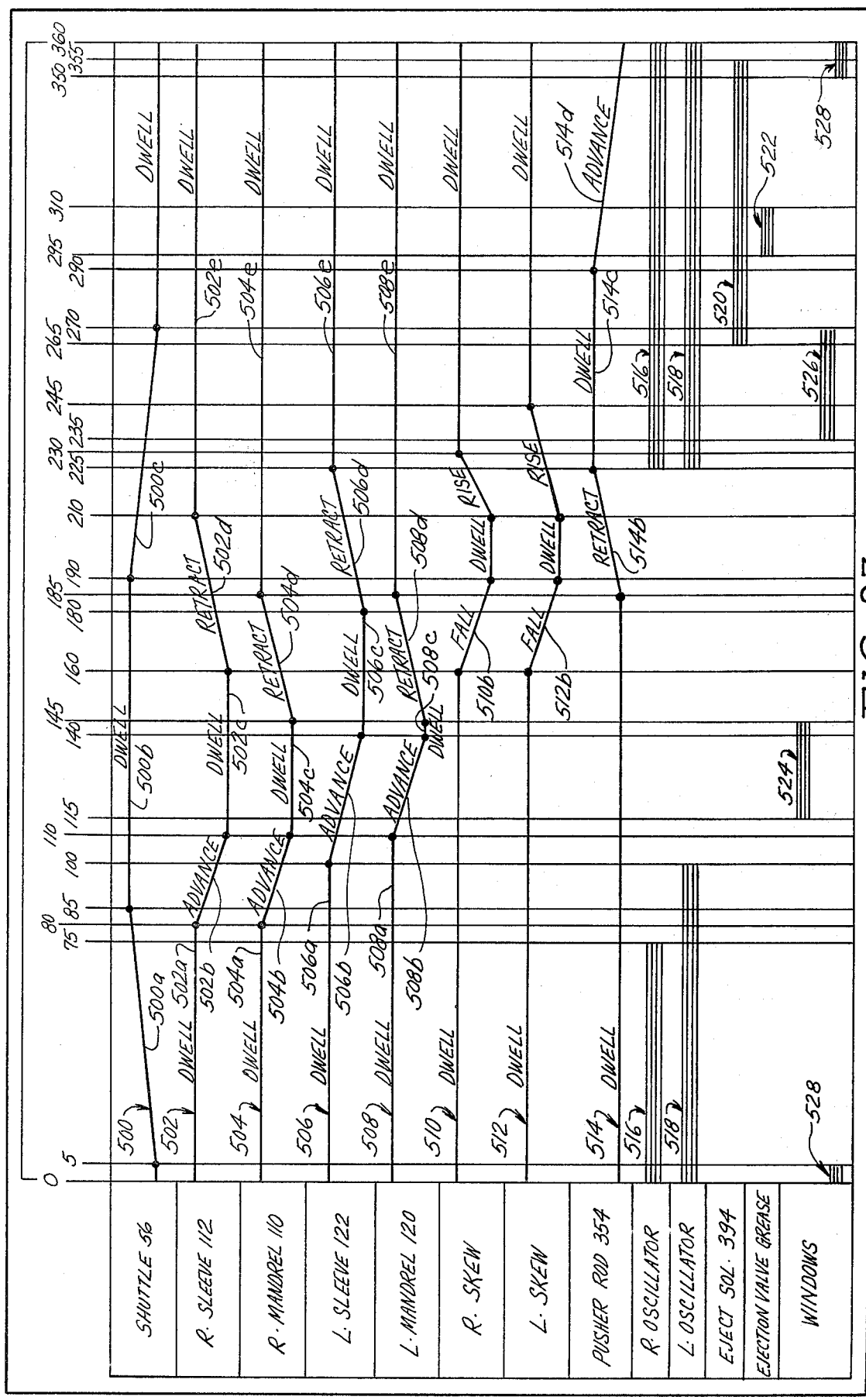
FIG. 23 is a timing diagram useful in explaining the operation of the machine shown in the drawing figures.

FIG. 23 illustrates a timing diagram representing the profiles for the various cam discs. The horizontal axis represents one machine cycle consisting of 360° rotation of camshaft 230; hence, it defines the complete peripheral profile for each cam. Each graph plot represents motion of the corresponding machine element if that element was being positioned by the corresponding cam over the full machine cycle. Because of the interaction explaind above in connection with the operation of mandrel 120 and pusher sleeve 122, actual motion of certain elements may not precisely correspond to what would be indicated by FIG. 23 during those periods of interaction. Such would be the case with mandrel 110 and sleeve 112 when mandrel 120 and sleeve 122 are being advanced. Graph plot 500 designates the motion diagram for shuttle 56; graph plot 502 that for shifting sleeve 112; graph plot 504 that for shifting mandrel 110; graph plot 506 that for shifting sleeve 122; graph plot 508 that for shifting mandrel 120; graph plot 510 that for the skew of sleeve 112; graph plot 112 that for the skew of sleeve 122; graph plot 514 that for shifting pusher rod 354. Reference numeral 516 designates a bar graph indicating the time at which mandrel 110 is oscillated by air motor 152; bar graph 518 designates the oscillation of mandrel 120 by air motor 206; bar graph 520, the actuation of the ejector 394, and bar graph 522, the operation of lubricant dispenser valve 376. The bar graphs 524, 526 and 528 represent the actuation of the associated proximity switch for checking synchronization. The bar graph 524 defines a window in which advancement of the sleeves and mandrels is monitored; bar graph 526 designates a window during which the shuttle should be in the retracted position and 528 designates a window during which the machine should complete its cycle.

Referring to graph plot 502, the segment 502a designates dwell time for sleeve 112 in the retracted position; the segmet 502b designates the advance of the sleeve; the segment 502c designates the dwell time in the advanced position; the segment 502d designates the retraction of the sleeve; and the segment 502e represents dwell time in the retracted position. Graph plots 506, 508, 510, 512 have analagous segments which are identified by literally suffixing the base numeral of the graph plot in the same manner as segments of graph plot 502 were literally suffixed. In the case of graph plots 502, 504, 506, 508 the respective advancing segments 502b, 504b, 506b, 508b will always have the corresponding crank roller 270 engaging the corresponding cam disk, at least until such time as the corresponding assembly element is stopped by the associated stop in the advance position. While the advance, forward dwell, and retract segments 502b, 504b, 502c, 504c, 502d, 504d of graph plots 502, 504 will reflect the motion of the corresponding element when acted upon by its own cam disk. It will be appreciated that the interaction of the other sleeve 122 and mandrel 120, with sleeve 112 and mandrel 110 will result in retraction of mandrel 110 and sleeve 112 during times when the graph plots 502, 504 indicate that the sleeve 112 and mandrel 110 are dwelling in the forward position. However, during some point in the actual retraction segments 502d, 504d, the rising segment of the corresponding cam is effective in retracting the corresponding assembly element.

In the case of graph plots 510 and 512, the segments 510b, 512b represent the time during which the acutal skewing operation is conducted.

In the case of graph plot 514, the segment 514b represents a rising portion of the associated cam causing the pusher rod 354 to retract. The retraction occurs as the shuttle is returning to the retracted position and allows a new pinion element to drop into receptacle 350 just before the shuttle receptacle returns to the retracted position. 514c represents dwell in the retracted position while 514d represents forward advance. The segment 500a represents shuttle travel to the forward position, 500b represents forward dwell and 500c represents the return of the shuttle to the retracted position.

The bar graphs 516, 518 show that the mandrels are being rapidly oscillated during the time that the respective assembly elements 108, 118 are in their retracted positions where new complement of needles are being formed.

The bar graph 520 corresponds to the actuation of ejector 394. This occurs just before the shuttle has returned to its retracted position and allows space for the just completed bearing assembly which is about to be unloaded from the shuttle.

The bar graph 522 shows that lubricant is being applied to the pinion engaged by the dispenser tip 374.

The use of insert 81 for the shuttle receptacle 68 and the separably mounted mandrels and sleeves allows different sized bearing assemblies to be assembled by simply changing those elements. The various stops may be conveniently reset as required. Normally, the timing provided by the cams does not require change. The standard cycle time for the machine is three seconds. This means that camshaft 230 rotates at twenty r.p.m. The supplies of needles, pinions and spacer rings are provided by conventional pieces of equipment which are well known in the field.

FIGS. 2a and 2b are plan and frontal views respectively of a modification which may be made to the machine in respect of the operation of the sleeves 112, 122. These drawing figures show the modification applied to the right hand sleeve 112. There is a corresponding modification to the left hand sleeve 122 which does not appear in the drawings. The modification involves a slightly different point of attachment of link 164 to the bracket by which it connects to member 134 as seen in FIG. 2a. The modification also includes a member 600 attached to the bracket. Projecting horizontally frontally of and supported for rotation about a horizontal, front-rear axis on member 600 is a roller 602. Disposed beneath roller 602 is a guide 604 which is adjustably mounted on a support 606 which is in turn bolted to surface 54. The guide 604 provides a flat, substantially horizontal surface on which roller 602 can roll at certain times during operation of the machine as will be hereinafter explained. The adjustable mounting of guide 604 on support 606 is accomplished by means of a pair of spaced holes 608 in guide 604 and matching vertical slots 610 in support 606 with a fastener 612 passing through each slot 610 to engage a hole 608. When the fasteners 612 are loose, the top surface of guide 604 may be adjusted as desired to horizontal or to an appropriate inclination. Once the desired setting has been obtained, the fasteners are tightened.

The construction of the mechanism relating to the translation of the sleeve is such that during sleeve retraction, while the sleeve is still forcefully engaging the bearing elements, a small component of rotation may be imparted to the sleeve if the modification of FIG. 2a and 2b is not present. It is possible for this component of rotation to unlock the skew lock that has been preciously imparted to the pinion assembly. The exact reason for this is not known, but a possible cause might be a certain instability of the bearing element arrays due to the axially directed forces of the sleeves on the arrays.

In a case where the bearing elements have been intentionally skew locked, it is possible for this component of rotation to unlock the skew lock. Alternatively, the bearing elements may purposely not have been skew locked, and the component of sleeve rotation which occurs during retraction may create undesired skew locking.

The modification provided by roller 602 and guide 604 can be set to be effective in each respective situation so that the rotation which would otherwise be imparted to the sleeve during retraction is counteracted by the engagement of the roller on the guide, the roller rolling along the guide during retraction, and being held against the guide by the link 164. It is also possible as a further alternative that the arrangement of the modification could be set to ensure that skew locking is imparted to a bearing assembly during retraction of the sleeve.

In the disclosed embodiment where skew locking has been imparted through the skewing mechanisms previously described, the guide 604 on each side of the machine is set to counteract any rotation which would otherwise be imparted to the sleeves so that the bearing elements remain skew locked and are not unlocked during retraction.

In this way the modification of FIGS. 2a and 2b provides a versatile feature useful for different bearing requirements. It will be recognized that principles of the modification are generic to skewing, non-skewing and even anti-skewing, although in the disclosed embodiment the intent is to prevent the skew lock from coming unlocked due to retraction of the sleeves. In other words the modification may be effective to counteract rotation or to impart rotation and hence the modification provides a generic control function. It is also possible that apart from the action of the mechanism, the lubricant which has been applied to the bore of the retainer and wiped over the bore by the assembly of the bearing arrays, may be effective by itself to keep the bearing elements skew-locked, or unskewed as the case may be. Hence the modification of FIGS. 2a and 2b may not be necessary in every bearing assembly machine embodying principles of the invention. However, it provides a versatile solution in particular situations.

While a preferred embodiment of the invention has been disclosed, it will be appreciated that principles of the invention as set forth in the following claims are applicable to other embodiments.

What is claimed is:

1. In a bearing assembly machine for assembling bearing elements into a retainer wherein bearing elements are arranged in a desired array and assembled to the retainer, the machine comprising first holding means for holding a retainer, second holding means for holding the array of bearing elements, and means for advancing one of the two holding means toward the other to assemble the array to the retainer and for retracting the holding means from each other upon completion of the assembly of the array to the retainer, an improved arrangement for advancing and retracting the one holding means comprising means providing a bias force, a coupling mechanism for coupling the bias force to the one holding means such that the bias force causes the one holding means to be urged in the direction of advance toward the other holding means, and control means comprising scheduling means defining a schedule of desired advance and desired retraction for said one holding means, said control means being operatively coupled with the coupling mechanism and acting via the coupling mechanism in opposition to the bias force for controlledly limiting the advance of said one holding means by the bias force in accordance with the desired schedule of advance to bring the array and the retainer into assembly and for counteracting the bias force to retract said one holding means after assembly of the array to the retainer has been completed, said scheduling means being constructed and arranged so as to be incapable of exerting any advancement force via said coupling means on said one holding means, said scheduling means comprising cam means, said cam means comprising a rising cam segment defining the desired schedule of retraction and a falling cam segment defining the desired schedule of advance, said scheduling means also comprising cam follower means which is urged into engagement with said cam means by the bias force such that said cam follower means is caused to follow said rising and falling cam segments, said control means and said coupling means being constructed and arranged such that if during advance an assembly force is encountered which is greater than that which can be developed by the bias force, said follower ceases to follow said falling cam segment.

2. The improvement set forth in claim 1 wherein the one holding means holds the array of bearing elements and the other holding means holds the retainer.

3. The improvement set forth in claim 2 wherein the one holding means comprises means for holding the array of bearing elements in a circular configuration.

4. The improvement set forth in claim 2 including a third holding unit for holding another array of bearing elements, means providing a second bias force, a second coupling mechanism for coupling the second bias force to the third holding means such that the second bias force causes the third holding mean to be urged in a direction of advance toward said other two holding means and opposite the direction of advance of the one holding means, and control means operatively coupled with the second coupling mechanism and acting via the second coupling mechanism in opposition to the second bias force for controllably limiting the advance of said third holding means by the second bias force in accordance with a desired schedule of advance to bring the second array into assembly with the retainer and for counteracting the second bias force to retract the third holding means after assembly of the second array to the retainer has been completed.

5. In a bearing assembly machine for assembling bearing elements into a retainer wherein bearing elements are arranged in a desired array and assembled to the retainer, the machine comprising first holding means for holding a retainer, second holding means for holding the array of bearing elements, and means for advancing one of the two holding means toward the other to assemble the array to the retainer and for retracting the holding means from each other upon completion of the assembly of the array to the retainer, an improved arrangement for advancing and retracting the one holding means comprising means providing a bias force, a coupling mechanism for coupling the bias force to the one holding means such that the bias force causes the one holding means to be urged in the direction of advance toward the other holding means, and control means operatively coupled with the coupling mechanism and acting via the coupling mechanism in opposition to the bias force for controlledly limiting the advance of said one holding means by the bias force in accordance with a desired schedule of advance to bring the array and the retainer into assembly and for counteracting the bias force to retract said one holding means after assembly of the array to the retainer has been completed, wherein the means providing a bias force comprises a pneumatic cylinder.

6. The improvement set forth in claim 5 wherein said control means comprises a crank pivotally mounted on the machine and a cam controlling the crank.

7. The improvement set forth in claim 6 wherein the rod of the pneumatic cylinder is operatively connected to one arm of the crank, said one arm of the crank is operatively connected with the one holding means and another arm of the crank is biased into engagement with the cam.

8. The improvement set forth in claim 7 wherein said crank includes a roller on said another crank arm riding on the periphery of said cam.

9. The improvement set forth in claim 8 wherein said cam comprises a falling profile allowing advance of the one holding means and a rising profile which is effective via the crank to overcome the bias force and cause retraction of the one holding means.

10. The improvement set forth in claim 5 wherein one side of the pneumatic cylinder is coupled to a regulator valve maintaining a substantially constant pneumatic pressure within the cylinder acting to exert the bias force, said valve maintaining a substantially constant pressure in the one side of the cylinder over the entire operating range of the cylinder.

11. The improvement set forth in claim 9 wherein said cam comprises a rotary disc and said rising and falling profiles are provided on the outer periphery of said disc.

12. In a bearing assembly machine for assembling bearing elements into a retainer wherein bearing elements are arranged in a desired array and assembled to the retainer, the machine comprising first holding means for holding a retainer, second holding means for holding the array of bearing elements, and means for advancing one of the two holding means toward the other to assemble the array to the retainer and for retracting the holding means from each other upon completion of the assembly of the array to the retainer, an improved arrangement for advancing and retracting the one holding means comprising means providing a bias force, a coupling mechanism for coupling the bias force to the one holding means such that the bias force causes the one holding means to be urged in the direction of advance toward the other holding means, and control means operatively coupled with the coupling mechanism and acting via the coupling mechanism in opposition to the bias force for controlledly limiting the advance of said one holding means by the bias force in accordance with a desired schedule of advance to bring the array and the retainer into assembly and for counteracting the bias force to retract said one holding means after assembly of the array to the retainer has been completed, and including a third holding unit for holding another array of bearing elements, means providing a second bias force, a second coupling mechanism for coupling the second bias force to the third holding means such that the second bias force causes the third holding mean to be urged in a direction of advance toward said other two holding means and opposite the direction of advance of the one holding means, and control means operatively coupled with the second coupling mechanism and acting via the second coupling mechanism in opposition to the second bias force for controllably limiting the advance of said third holding means by the second bias force in accordance with a desired schedule of advance to bring the second array into assembly with the retainer and for counteracting the second bias force to retract the third holding means after assembly of the second array to the retainer has been completed, wherein the relative advances of the other holding means and the third holding means are so arranged that the advance of the third holding means is effective to retract the other holding means a limited amount in completing the assembly of the second array of bearing elements to the retainer.

13. The improvement set forth in claim 12 including means operated in timed relation to the assembly of the two arrays into the retainer such that with the two arrays assembled into the retainer and still engaged by the other and the third holding means, said other and third holding means are actuated in opposite senses to impart a twist lock to the two arrays of bearings in the retainer.

14. In a bearing assembly machine for assembling bearing elements into retainers wherein bearing elements are arranged in desired arrays and assembled to the retainers, the combination of a shuttle moveable between a loading station and an assembly station for conveying a retainer from the loading station to the assembly station and holding the retainer at the assembly station, assembly elements at the assembly station disposed on opposite sides of the shuttle comprising means for organizing bearing elements in predetermined arrays on opposite sides of the shuttle and for inserting the arrays into the retainer by advancing the two arrays in timed relationship, pneumatic cylinders disposed on opposite sides of the shuttle operatively associated with the assembly elements, a rotary camshaft containing cams disposed spaced from and parallel to the travel of the shuttle, said pneumatic cylinders urging the assembly elements in the direction of advance and cranks pivotally mounted on the machine on opposite sides of the shuttle operatively connected with the cams and the pneumatic cylinders whereby the cams acting through the cranks control the advance of the assembly elements while the assembly forces are provided by the pneumatic cylinders.

15. The combination set forth in claim 14 wherein said assembly elements comprise a mandrel and a pusher sleeve on each side of the shuttle at the assembly station, means cooperating with each mandrel and pusher sleeve allowing bearing elements to be organized in circular arrays on opposite sides of the shuttle at the assembly station, each mandrel and each pusher sleeve having operatively associated therewith an individual one of said pneumatic cylinders, an individual one of said cams and an individual one of said cranks.

16. The combination set forth in claim 15 including means to skew lock bearing elements in retainers comprising a further individual one of said pneumatic cylinders, a further individual one of said cams, and a further individual one of said cranks operatively associated with each one of the pusher sleeves for causing the pusher sleeves to rotate after the bearing elements have been assembled into a retainer and while the pusher sleeves are forcefully maintained against the bearing elements.

17. The combination set forth in claim 15 wherein each of said individual cams comprises a falling cam segment allowing the corresponding assembly element to advance and a rising cam segment causing the corresponding cam element to retract.

18. The combination set forth in claim 17 wherein the cams are so timed that the advancing action of one mandrel and the corresponding pusher sleeve causes partial retraction of the opposite mandrel and pusher sleeve.

19. The combination set forth in claim 15 including means to impart oscillatory rocking motion to the mandrel while the bearing elements are being organized in their circular arrays.

20. The combination set forth in claim 14 including loading means operable to load a new retainer into the shuttle when the shuttle iis at the loading station.

21. The combination set forth in claim 20 including an unloading station directly opposite the loading station relative to the shuttle, the loading means when operated, causing a completed retainer to be unloaded from the shuttle by the act of the loading means loading a new retainer into the shuttle.

22. The combination set forth in claim 20 including a lubrication means carried by the loading means and operable in timed relation to the operation of the loading means for imparting lubrication to a retainer in a stack of retainers overlying the retainer which is being loaded into the shuttle.

23. The combination set forth in claim 15 wherein the shuttle is operated by a pneumatic cylinder acting in cooperation with a crank controlled by a cam on the camshaft.

24. The combination set forth in claim 15 including a spacer ring loading station and a receptacle on said shuttle for conveying a spacer ring from the spacer ring loading station to the assembly station when the shuttle operates to bring a completed retainer from the assembly station to the unloading station.

25. In a bearing assembly machine for assembling bearing elements into a retainer wherein bearing elements are arranged in a desired array and assembled to the retainer, the machine comprising first holding means for holding a retainer, second holding means for holding the array of bearing elements, and translating means for advancing one of the two holding means toward the other to assemble the array to the retainer and for retracting the holding means from each other upon completion of the assembly of the array to the retainer, said translating means including twist means for imparting desired twisting rotation to the assembled array via said second holding means, but wherein during retraction the translating means may impart an undesired twisting rotation to the assembled bearing elements via said second holding means, the improvement which comprises first means on said twist means and second means independent of said twist means, said first and second means coacting to be interactive with the translating means, including said twist means, during retraction for counteracting such undesired twisting rotation.

26. The improvement set forth in claim 25 wherein the wherein said first means comprises a roller mounted on said twist means and said second means comprises a guide along which said roller rides during retraction to counteract undesired twisting rotation.

* * * * *